US010204283B2

(12) United States Patent
Tate et al.

(10) Patent No.: US 10,204,283 B2
(45) Date of Patent: Feb. 12, 2019

(54) IMAGE RECOGNIZING APPARATUS, IMAGE RECOGNIZING METHOD, AND STORAGE MEDIUM

(71) Applicant: CANON KABUSHIKI KAISHA, Tokyo (JP)

(72) Inventors: Shunta Tate, Tokyo (JP); Katsuhiko Mori, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 394 days.

(21) Appl. No.: 14/792,885

(22) Filed: Jul. 7, 2015

(65) Prior Publication Data

US 2016/0012277 A1 Jan. 14, 2016

(30) Foreign Application Priority Data

Jul. 11, 2014 (JP) ................................ 2014-143276

(51) Int. Cl.
*G06K 9/62* (2006.01)
*G06K 9/34* (2006.01)
*G06K 9/00* (2006.01)

(52) U.S. Cl.
CPC .............. *G06K 9/34* (2013.01); *G06K 9/6227* (2013.01); *G06K 9/6292* (2013.01); *G06K 9/00664* (2013.01)

(58) Field of Classification Search
CPC ............ G06K 9/00664; G06K 9/6292; G06K 9/6227; G06K 9/34; G06T 7/0081
See application file for complete search history.

(56) References Cited

U.S. PATENT DOCUMENTS 6,304,271 B1 * 10/2001 Nehme ..................... G06T 1/20
345/620
8,855,388 B2 * 10/2014 Wehnes ............... G06T 7/0012
382/128
(Continued)

FOREIGN PATENT DOCUMENTS

JP 2004220555 A 8/2004
JP 2005-063309 A 3/2005
(Continued)

OTHER PUBLICATIONS

Ladicky, et al., "What, Where & How Many?", Combining Object Detectors and CRFs, ECCV, pp. 1-14, 2010.
(Continued)

*Primary Examiner* — Mia M Thomas
(74) *Attorney, Agent, or Firm* — Carter, Deluca, Farrell & Schmidt, LLP

(57) ABSTRACT

The accuracy of estimating the category of an object in an image and its region is improved. The present invention detects as to whether each of a plural types of objects is included in an object image, forms a plurality of local regions in a region including the object detected, and calculates a feature quantity of the plurality of local regions formed. Furthermore, the present invention selects a discriminant criterion adapted to the type of the object detected, from a plurality of discriminant criteria for discriminating the plural types of objects, and determines, based on the discriminant criterion selected and the feature quantity calculated, a region of the object detected from the plurality of local regions.

19 Claims, 23 Drawing Sheets

(56) References Cited

U.S. PATENT DOCUMENTS

| | | | | |
|---|---|---|---|---|
| 8,861,869 | B2* | 10/2014 | Shechtman | G06K 9/6211 |
| | | | | 382/218 |
| 8,923,594 | B2* | 12/2014 | Wehnes | G06T 7/0012 |
| | | | | 382/132 |
| 9,089,288 | B2* | 7/2015 | You | A61B 3/12 |
| 9,147,129 | B2* | 9/2015 | Liu | G06N 99/005 |
| 2015/0049943 | A1* | 2/2015 | Hamsici | G06K 9/4609 |
| | | | | 382/170 |

FOREIGN PATENT DOCUMENTS

| | | |
|---|---|---|
| JP | 2014010633 A | 1/2014 |
| JP | 2014021602 A | 2/2014 |

OTHER PUBLICATIONS

Felzenszwalb, et al., "Efficient Graph-Based Image Segmentation", International Journal of Computer Vision, vol. 59, No. 2, pp. 1-26, Sep. 2004.

Felzenszwalb, et al., "Object Detection with Discriminatively Trained Part Based Models", IEEE Transactions on Pattern Analysis and Machine Intelligence, vol. 32, No. 9, pp. 1-20, Sep. 2010.

Malik, et al., "Contour and Texture Analysis for Image Segmentation", International Journal of Computer Vision, vol. 43 (1), pp. 7-27, 2001.

John C. Platt, "Probabilistic outputs for support vector machines and comparison to regularized likelihood methods", Advances in Large Margin Classifiers, Cambridge, MA, MIT Press, pp. 1-11, Mar. 26, 1999.

Bach, et al., "Learning spectral clustering", Advances in Neural Information Processing Systems, vol. 16, pp. 305-312, 2004.

Agarwal, et al., "Recovering 3D human pose from monocular images", IEEE Transactions on Pattern Analysis & Machine Intelligence, vol. 28, pp. 44-58, 2006.

Gall et al., "Class-Specific Hough Forests for Object Detection", IEEE Conference on Computer Vision and Pattern Recognition (CVPR'09), pp. 1-8, 2009.

Suzuki et al., "Automatic Hair Detection and Tracking System Using Kinect," Faculty of Systems Engineering, Wakayama University, Sep. 15, 2013, pp. 323-329, vol. 57, No. 9.

Japanese Office Action dated May 15, 2018 and issued in corresponding Japanese Patent Application No. 2014-143276 together with translation.

* cited by examiner

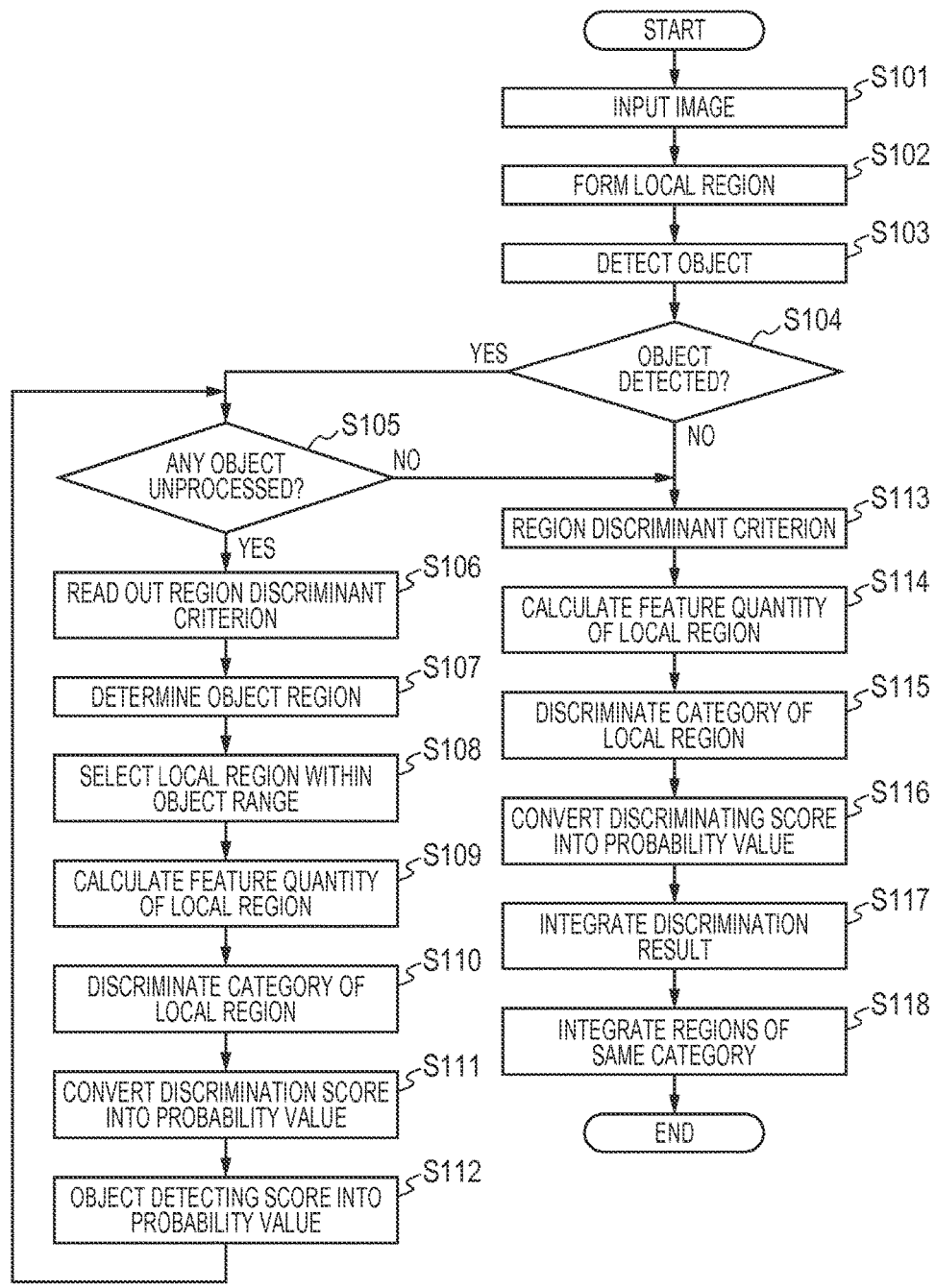

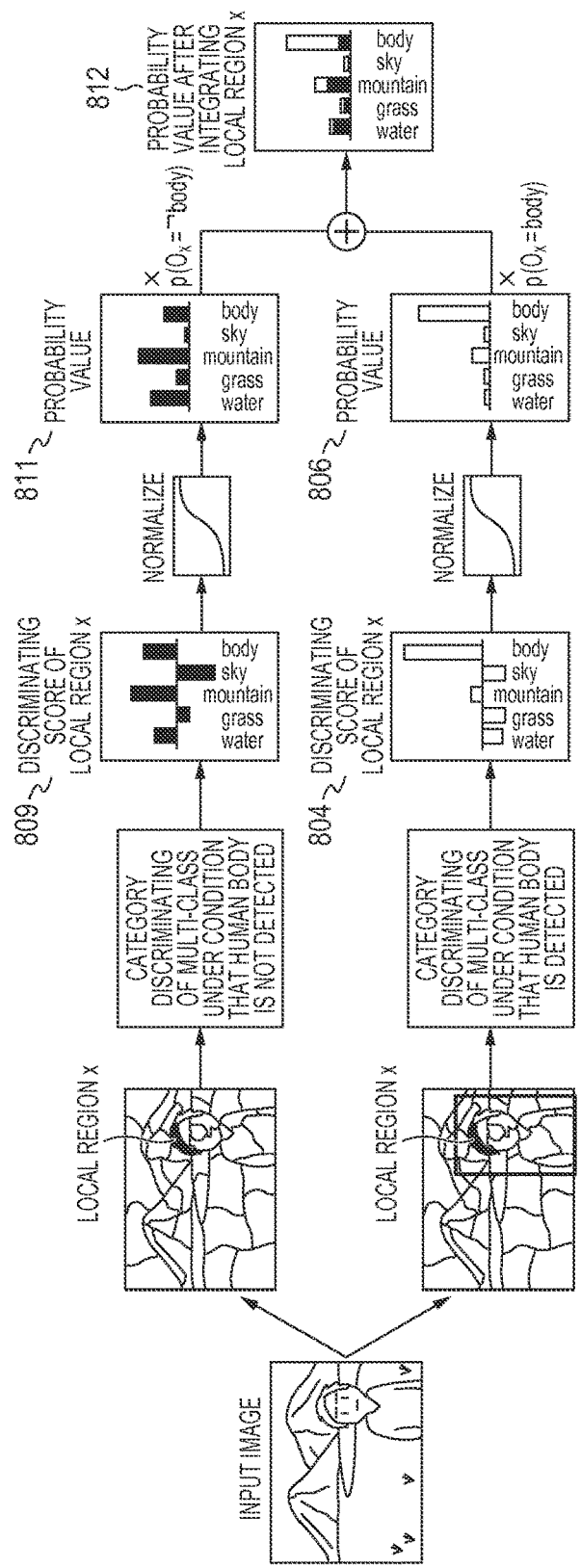

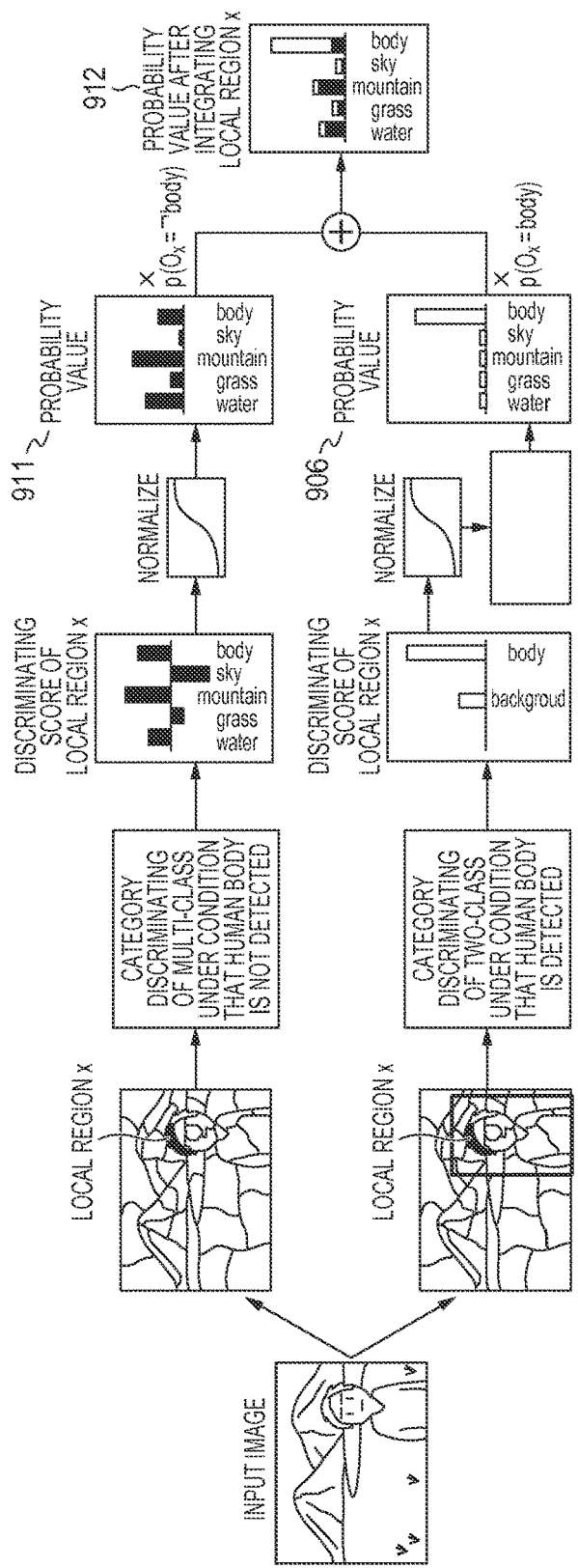

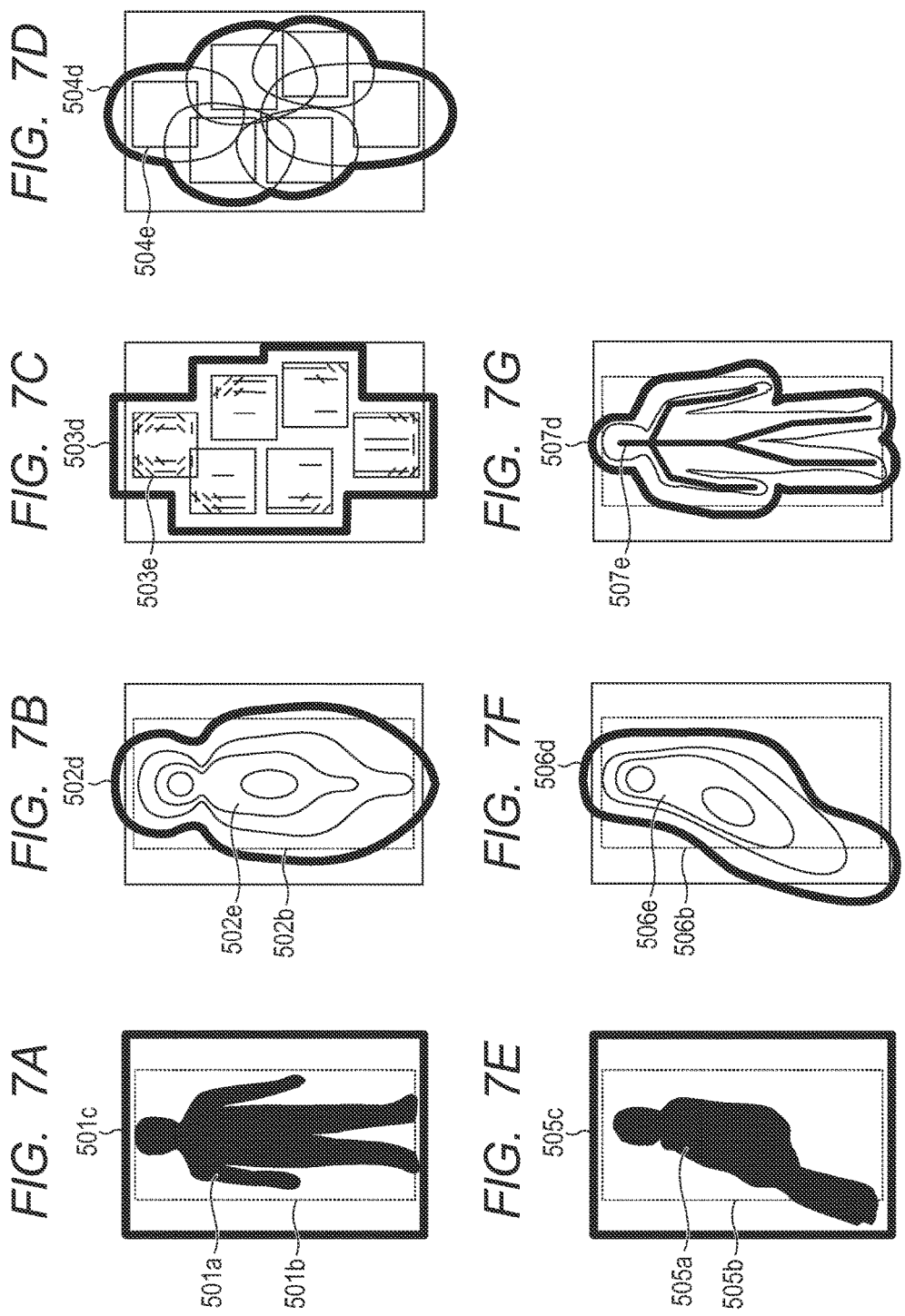

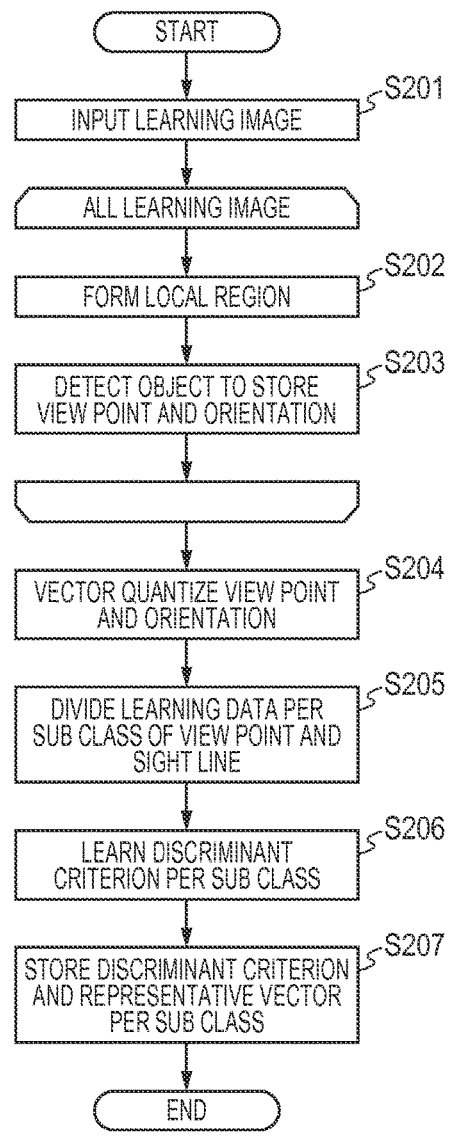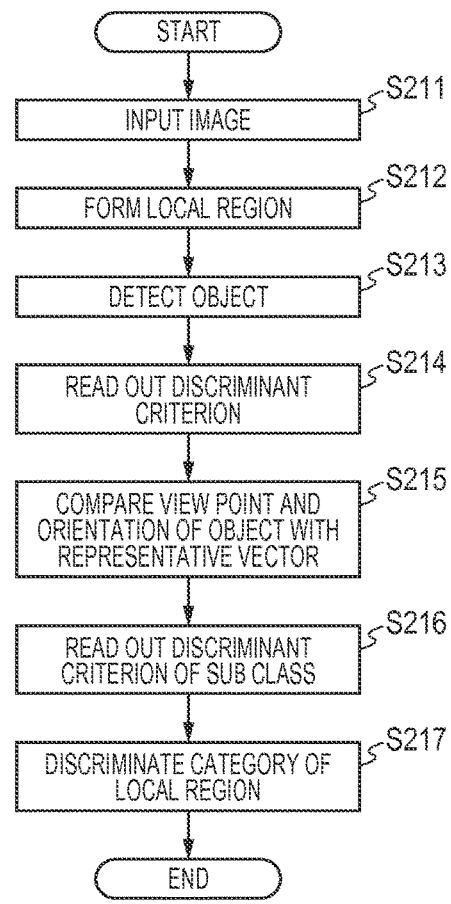

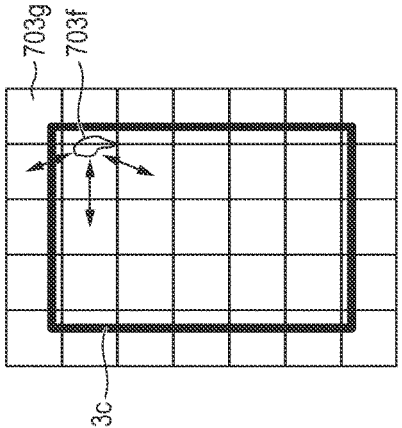
FIG. 12A
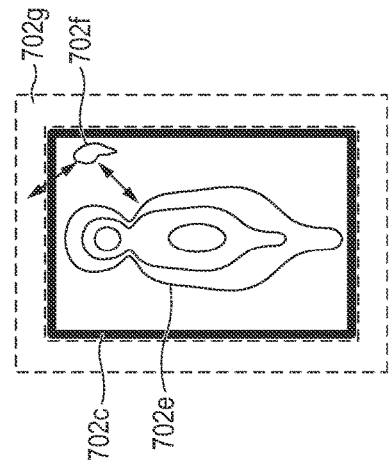
FIG. 12B
FIG. 12C
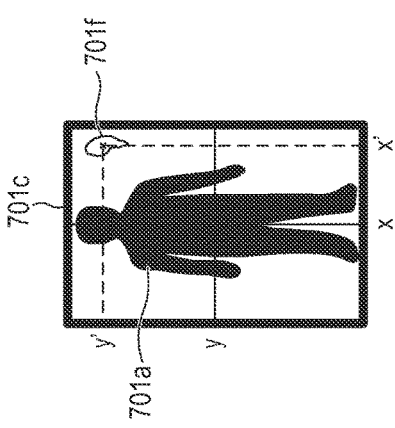
FIG. 12D
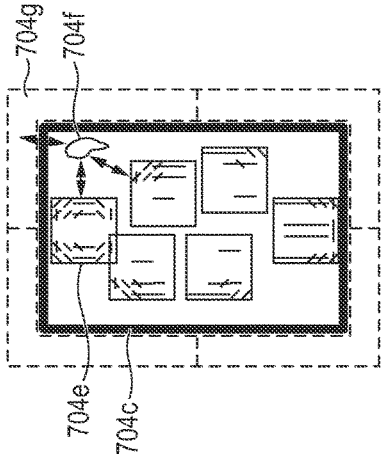
FIG. 12E
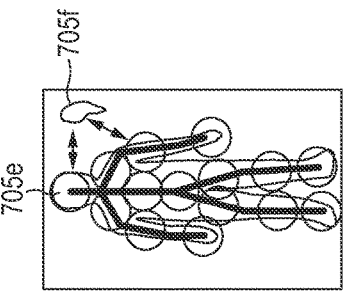

| FIG. 18A |
| FIG. 18B |

IMAGE RECOGNIZING APPARATUS, IMAGE RECOGNIZING METHOD, AND STORAGE MEDIUM

BACKGROUND OF THE INVENTION

Field of the Invention

The present invention relates to a technique of recognizing the category of an object in an image and its region.

Description of the Related Art

Techniques of discriminating regions according to the categories of objects are called semantic region division. The conventional semantic region division methods include the following two types of techniques. The first technique discriminates the category of an object in each local region based on the feature of the local region. As the second technique, Non Patent Literature 1 (Lubor Ladicky, Paul Sturgess, Karteek Alahari, Chris Russell, and Philip H. S. Torr, What, Where & How Many? Combining Object Detectors and CRFs, ECCV 2010) describes a technique that improves the accuracy of region division by adopting a technique of detecting a specific object in combination with the first technique. The method of Non Patent Literature 1, first, estimates a range in which an object resides, based on an object detection result. Next, this method raises the likelihood of the category of the object by a predetermined value during discrimination of the local region, because the likelihood of being the object in the region in the range is higher than the likelihoods in the other regions.

However, the position and range of the object that can be estimated from a detection result of the object contain errors. Consequently, if the likelihood is uniformly high in the estimated range, the accuracy of the boundary of the obtained region division result is low. To improve the accuracy of the boundary, Non Patent Literature 1 takes the following measures. That is, first, the range of the object is divided into two regions that are a foreground and a background, based on the color feature. Next, since the local region estimated as a foreground has a higher likelihood of being the object than the other regions, the likelihood of the category of the object is raised by a predetermined value only in the local region having been estimated as the foreground, and discrimination is performed.

Unfortunately, if the background region has a color similar to that of the detected object, this method sometimes erroneously discriminates the foreground and background. A complicated background and overlapping objects may also lead to mis-discrimination. That is, according to the method that identifies the foreground of the object and uniformly changes the likelihood, it is sometimes difficult to discriminate a certain object.

The present invention has been made in view of the above points, and has an object to improve the accuracy of recognizing the category of the object and its region in the image.

SUMMARY OF THE INVENTION

According to an aspect of the present invention, an image recognizing apparatus comprises: a detecting unit configured to detect as to whether each of a plural types of objects is included in an object image; a forming unit configured to form a plurality of local regions in a region including the object detected; a first calculating unit configured to calculate a feature quantity of the plurality of local regions formed; and a determining unit configured to select a discriminant criterion adapted to the type of the object detected, from a plurality of discriminant criteria for discriminating the plural types of objects, and to determine, according to the discriminant criterion selected, and based on the feature quantity calculated by the first calculating unit, a region of the object detected from the plurality of local regions.

Further features of the present invention will become apparent from the following description of exemplary embodiments with reference to the attached drawings.

BRIEF DESCRIPTION OF THE DRAWINGS

FIG. 3 is a flowchart illustrating a flow of a recognition process in a first embodiment.

FIGS. 5A and 5B are diagrams illustrating a method, and its results, of integrating discrimination results in the first embodiment.

FIGS. 7A, 7B, 7C, 7D, 7E, 7F and 7G are schematic diagrams for illustrating methods of determining object ranges.

FIGS. 10A and 10B are flowcharts illustrating flows of a learning process and a recognition process in another mode of the first embodiment.

FIGS. 12A, 12B, 12C, 12D and 12E are schematic diagrams for illustrating methods of calculating the feature of degree of similarity in a local region.

DESCRIPTION OF THE EMBODIMENTS

Preferred Embodiments of the Present Invention will now be described in detail in accordance with the accompanying drawings.

The present invention relates to an image recognizing apparatus, method and program that recognize the category of an object in an image and its region. In a specific example, image information, such as a still image, moving image or range image in which scenery or an object has been taken, is received as an input image, the category of the object in the input image and its region are identified. The categories of objects concerned are natural objects, artificial objects, tangible objects, intangible objects, general objects, specific objects and the like, such as sky, sea, forest, a person, a building, an automobile, and an industrial product.

First Embodiment

In a first embodiment, a method is described that receives a two-dimensional image data as an input image and then determines which categories of objects regions in the input image belong to. In this embodiment, the image is divided into multiple local regions, and the categories of objects are discriminated for each local region. The categories of objects dealt with in this embodiment are defined to fall into two categories. One category contains objects, such as a human body and an animal. The other category contains background regions, such as sky, a mountain, grass and a building.

In this embodiment, the following measures are taken. First, the categories of objects in the local regions are discriminated based on the feature quantities in the local regions. This process is the same as that of a conventional method. A discriminant criterion used at this time is the same as that of the conventional method. In this embodiment, the criterion is called a general-purpose discriminant criterion. Next, in a local region in a range where an object is detected, the category of the object is discriminated using a discriminant criterion having preliminarily been learned under a condition of presence of a detected object there. This discriminant criterion is called an object-specific discriminant criterion. Two discrimination results are integrated. The methods of obtaining the respective discriminant criteria will be described in detail in an after-mentioned learning process. Thus, the region in which presence of an object is assumed is discriminated in detail with reference to the object-specific discriminant criterion. Consequently, even for an object with large variation in appearance, such as a human body, the accuracy of region division can be improved more than that in the conventional case.

(Configuration of Image Recognizing Apparatus)

Figure 1:
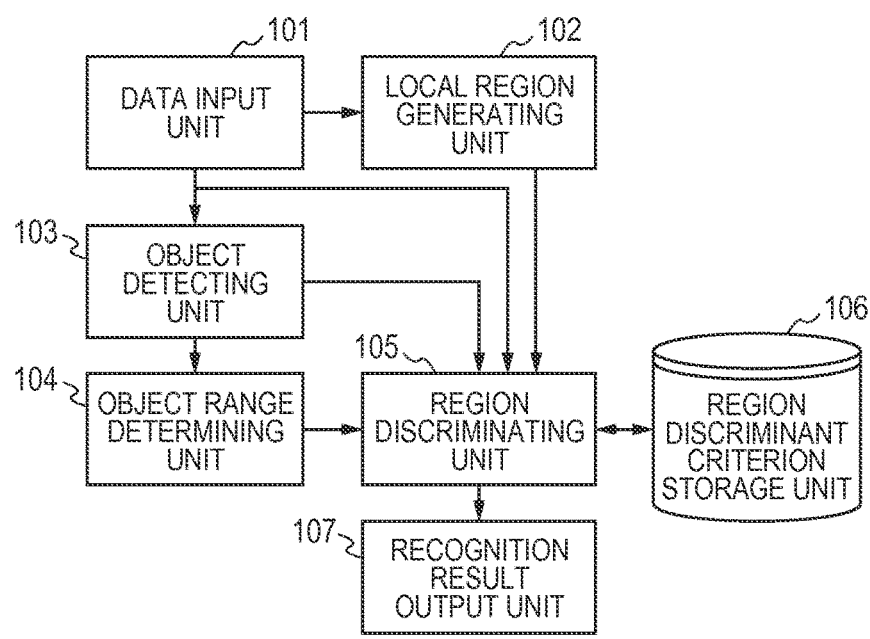
FIG. 1 is a diagram illustrating a configuration of an image recognizing apparatus.

FIG. 1 illustrates a configuration of an image recognizing apparatus according to a first embodiment.

A data input unit 101 receives an image to be recognized.

A local region generating unit 102 divides the input image into multiple local regions by a predetermined method.

An object detecting unit 103 detects a predetermined object in the input image, and identifies the type, size and position of the object.

An object range detecting unit 104 determines an approximate range (hereinafter, called an object range) where the detected object exists, based on the detection result of the object detecting unit 103.

A region discriminating unit 105 discriminates the category of the object in each local region.

A region discriminant criterion storage unit 106 holds multiple types of parameters of discriminant criteria for discriminating the category of the object in the local region, more specifically, the parameters of a general-purpose discriminant criterion, and the parameters of an object-specific discriminant criterion.

The recognition result output unit 107 integrates the estimation results of the categories of the objects in the respective local regions, and outputs the integrated result as a recognition result.

Here, data flows between configuration elements are additionally described. The region discriminating unit 105 receives the input image from the data input unit 101, and receives information on each local region from the local region generating unit 102. The region discriminating unit 105 reads the parameters of the discriminant criteria from the region discriminant criterion storage unit 106, calculates the feature quantity in each local region, and estimates the category of the object in each local region based on the feature quantity and the discriminant criteria.

Here, if the object is detected by the object detecting unit 103, the following process is additionally performed. That is, the object detecting unit 103 transmits a control signal indicating the detection, and information on the property, such as the type of the object, to the region discriminating unit 105. The object range detecting unit 104 transmits information on the object range to the region discriminating unit 105. The region discriminating unit 105 reads the parameters of the appropriate discriminant criterion from the region discriminant criterion storage unit 106, based on information on the property of the object. Furthermore, the region discriminating unit 105 calculates the feature quantity in each local region in the object range, and estimates the category of the object in the local region in the object range, based on the feature quantity and the discriminant criterion.

Figure 2:
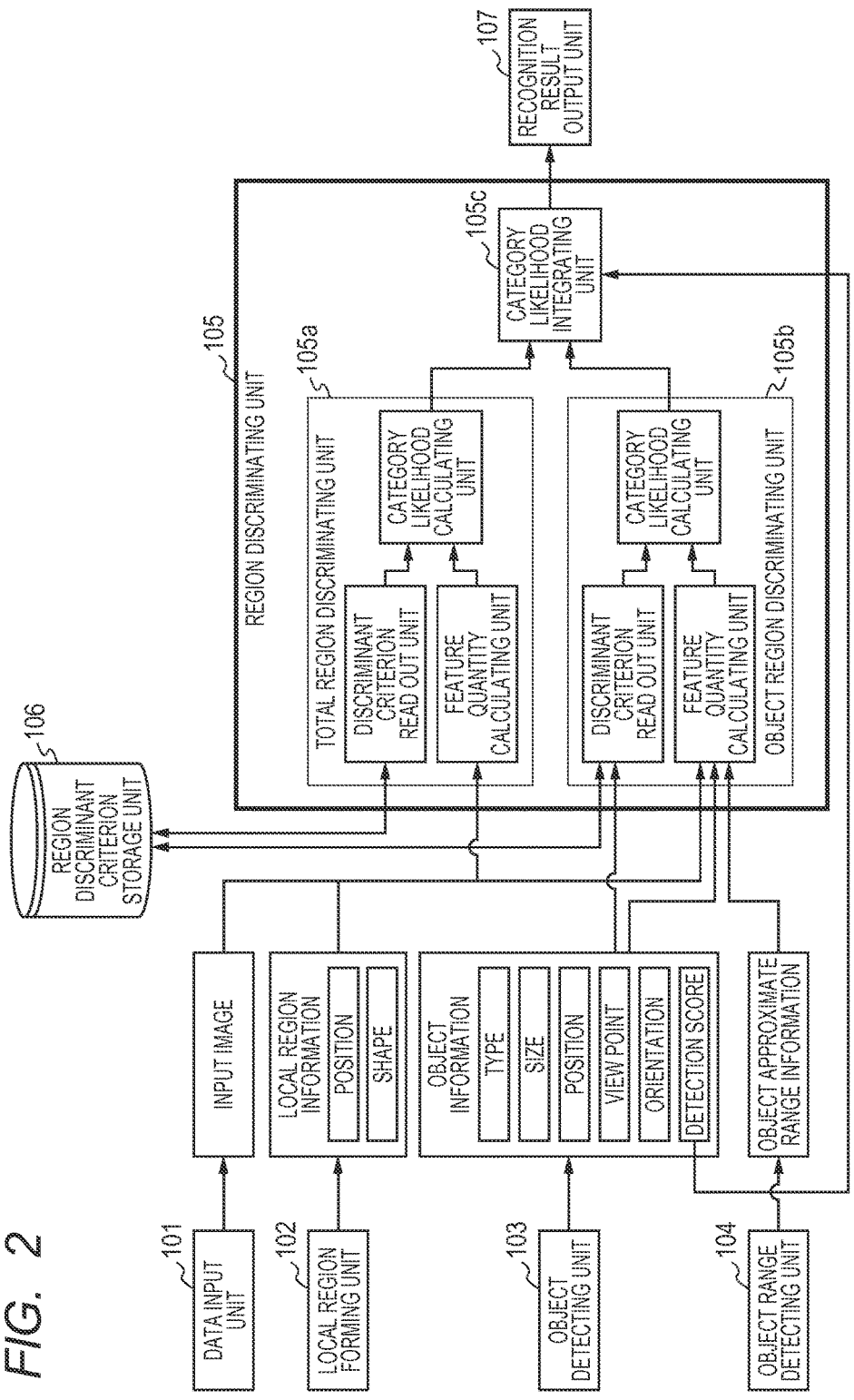
FIG. 2 is a diagram illustrating a functional configuration of a region discriminating unit.

FIG. 2 illustrates the functional configuration of the region discriminating unit 105. The region discriminating unit 105 receives the input image from the data input unit 101, information on each local region from the local region generating unit 102, information on the property of the detected object from the object detecting unit 103, and information on the object range from the object range detecting unit 104.

The region discriminating unit 105 includes a total region discrimination unit 105a, an object region discriminating unit 105b and a category likelihood integrating unit 105c.

The total region discrimination unit 105a includes a discriminant criterion readout unit, a feature quantity calculating unit and a category likelihood calculating unit, reads the parameters of the general-purpose discriminant criterion from the region discriminant criterion storage unit 106, and calculates the likelihoods of the categories of the objects in all the local regions in the image.

The object region discriminating unit 105b includes a discriminant criterion readout unit, a feature quantity calculating unit and a category likelihood calculating unit, reads the parameters of the object-specific discriminant criterion from the region discriminant criterion storage unit 106 according to the detected object, and obtains the likelihood of the category of the object in each local region in the object range.

The category likelihood integrating unit 105c integrates the two results of the category likelihoods from the total region discrimination unit 105a and the object region discriminating unit 105b, and transmits the integrated result to the recognition result output unit 107. The process of integration will be described later in detail.

(Description of Recognition Process)

FIG. 3 is a flowchart illustrating the flow of a recognition process in this embodiment. The recognition process is described also with reference to FIG. 1. Examples of results of processes are appropriately described with reference to FIGS. 4A to 4F, 5A and 5B.

Figure 4C:
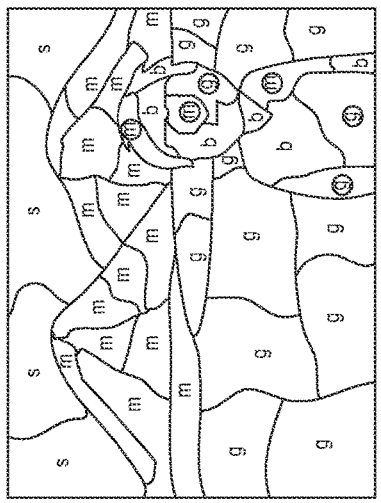
FIGS. 4A, 4B, 4C, 4D, 4E and 4F are diagrams illustrating results of the recognition process in the first embodiment.
Figure 4B:
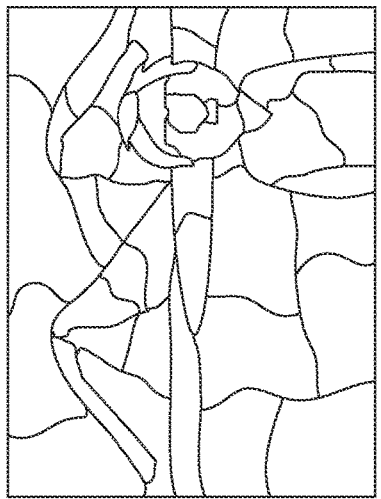
Figure 4A:
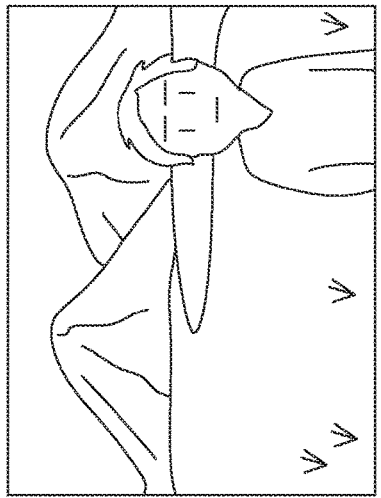

In step S101, the data input unit 101 receives an input image, and transmits the input image to the local region generating unit 102, the object detecting unit 103 and the region discriminating unit 105. Here, the input image may be an image as illustrated in FIG. 4A, for example.

In step S102, the local region generating unit 102 divides the input image into multiple local regions, based on the RGB color information on the input image. The local region is also called superpixels. For example, an existing method, such as Non Patent Literature 2 (Pedro F. Felzenszwalb and Daniel P. Huttenlocher, Efficient Graph-Based Image Segmentation, International Journal of Computer Vision, Volume 59, Number 2, September 2004), has been widely known. FIG. 4B illustrates an example of the generated local regions. In this embodiment, the information on the local regions is transmitted to the region discriminating unit 105. The processes after this stage are performed for each local region, which is regarded as an element unit. Consequently, the total processing speed can be improved in comparison with the case of adopting a pixel as an element unit. Note that the present invention does not limit the size or shape of the local region. A rectangular block having a larger size may be adopted as a local region. Alternatively, each pixel of the image may be adopted as a local region in another mode.

In step S103, the object detecting unit 103 performs a recognition process as to whether the input image contains a predetermined object or not. The object to be detected is a typical object, such as a human body, a car, a dog, or an airplane. The method of detecting the object is not necessarily identical across all objects. Appropriate methods suitable to the respective objects may be used. As a method of detecting the object with high accuracy, for example, Non Patent Literature 3 (P. Felzenszwalb, R. Girshick, D. McAllester, D. Ramanan, Object Detection with Discriminatively Trained Part Based Models, IEEE Transactions on Pattern Analysis and Machine Intelligence, Vol. 32, No. 9, September 2010) has been publicly known. This embodiment also uses the method of Non Patent Literature 3. The object detecting unit 103 detects the object in the image. If the detection score is at least a predetermined threshold, this unit transmits information on the type, position, size and detection score to the object range detecting unit 104 and the region discriminating unit 105.

Here, if the object detecting unit 103 has a function of estimating the direction of the object, such as a backward direction or a lateral direction, another mode can be considered that additionally outputs the estimation result of the direction as view point information, which is to be used in a process on the following stage. If an object to be processed is an articulated object, such as a person, and the object detecting unit 103 has an orientation information estimating function that estimates orientation information, such as on a standing orientation or a seated orientation, another mode can be considered that additionally outputs the orientation information on the object. The mode of using the information on the view point and the orientation of the object will be described later as another mode of this embodiment.

In steps S104, it is determined whether an object is detected or not in step S103. If the object is detected, the processing proceeds to step S105. If no object is detected, the processing proceeds to step S113.

Processes in and after step S105 define the object range for each detected object, and discriminate the category of each object in the local region in the object range.

In step S105, it is determined whether there is any unprocessed object or not. If there is any unprocessed object, the processing proceeds to step S106. If there is no unprocessed object, the processing proceeds to step S113.

In step S106, the region discriminating unit 105 reads out the parameters of the discriminant criterion from the region discriminant criterion storage unit 106. The region discriminant criterion storage unit 106 stores the parameters of one general-purpose discriminant criterion, and the parameters of object-specific discriminant criteria. The region discriminating unit 105 reads out the parameters of an appropriate discriminant criterion corresponding to the detected object.

Figure 6A:
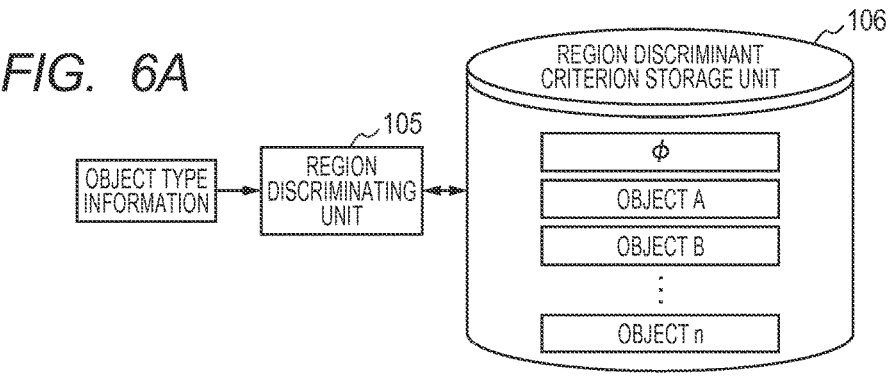
FIGS. 6A, 6B and 6C are diagrams illustrating examples of functional configurations of sections related to readout of parameters of discriminant criteria.

FIG. 6A illustrates an example of the functional configuration of a section related to readout of the parameters of the discriminant criterion. The region discriminating unit 105 receives information on the type of the detected object, and reads out the parameters of the corresponding object-specific discriminant criterion from the region discriminant criterion storage unit 106. Note that the symbol $\phi$ in the diagram represents the parameters of the general-purpose discriminant criterion.

In step S107, the object range detecting unit 104 determines the object range of the detected object, based on the detection result of the object detecting unit 103. There are various methods for this process. The simplest example is a mode of using the position and size of the object that are output from the object detecting unit 103. The case where the detected object is a human body is exemplified here. FIG. 7A illustrates the relationship between a human body 501a, a detection window 501b of the object that indicates the position and size where the human body is detected, and an object range 501c. The object range detecting unit 104 enlarges the detection window 501b where the object is detected, vertically and horizontally by a predetermined ratio, and defines the enlarged range as the object range 501c. Here, the detection window is enlarged vertically by 5% and horizontally by 50%. Information on the determined object range 501c is transmitted to the region discriminating unit 105.

The detection window 501b of the object is not defined as the object range but is thus enlarged to the predetermined range to define the object range 501c, because at certain orientations of the four limbs of the human body 501a, the region of the human body easily extends off the detection window 501b of the object. There are various methods of determining the object range. The methods will be collectively described later in detail.

Figure 4F:
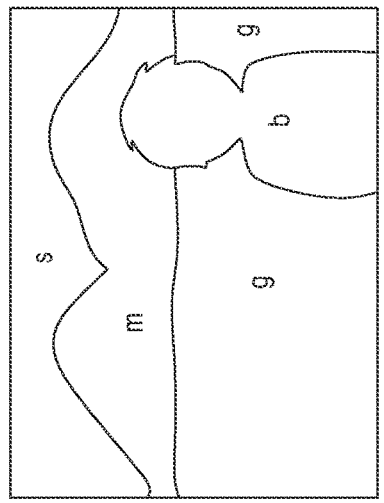
Figure 4E:
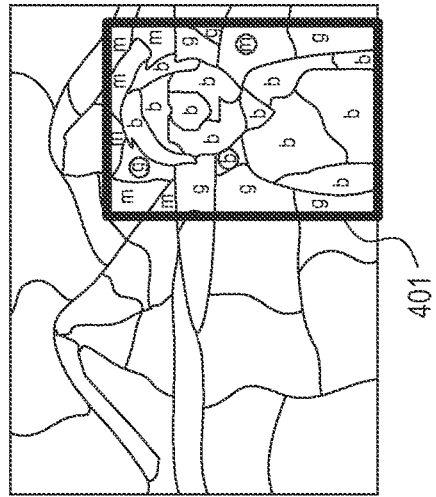
Figure 4D:
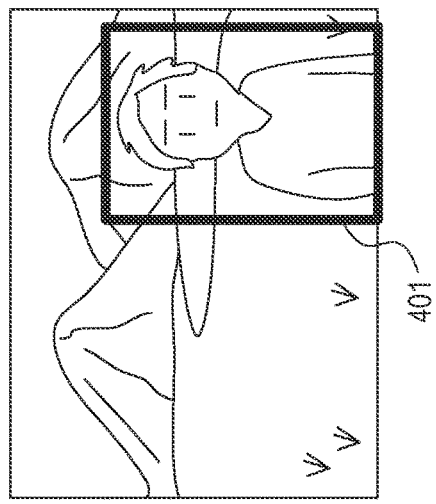

Thus, an example of a result of the object range determined in step S107 is indicated by a black frame 401 in FIG. 4D.

In step S108, the region discriminating unit 105 determines whether each local region is included in the object range or not, and selects the local region within the object range. The determination criterion as to whether each local region is included in the object range or not is whether the local region overlaps with the object range on at least a predetermined number of pixels or not. Alternatively, another criterion as to whether the barycenter of the local region is included in the object range or not may be adopted.

In step S109, the region discriminating unit 105 calculates the feature quantity of the local region in the object range. Here, a RGB histogram or a typical texture feature quantity is used. The typical texture feature quantity is disclosed in Non Patent Literature 4 (Jitendra Malik, Serge Belongie, Thomas Leung and Jianbo Shi, Contour and Texture Analysis for Image Segmentation, International J. of Computer Vision 43(1), 7-27, 2001).

Furthermore, the region discriminating unit 105 calculates feature quantities that are relatively determined based on the object detection result. The feature quantity are a feature on the position that roughly locates the local region with respect to the detected object, and a feature on the degree of similarity as to whether the feature is close to that of the foreground of the detected object or to that of the background. The details will be described later.

In step S110, the region discriminating unit 105 discriminates the category of the object in the local region in the object range. At this time, the parameters of the object-specific discriminant criterion read out in step S106 are used. In this embodiment, a support vector machine, which is a representative discrimination technique, is adopted. In this embodiment, a support vector machine is prepared for each category to be discriminated, two-class discrimination as to whether the local region corresponds to the category or not is performed for each of a number of categories. Thus, the discrimination result is obtained as the discrimination score for each category. The parameters of discriminant criteria in this embodiment are mainly the parameters of support vectors of the support vector machine.

Note that the target category for the region division is not necessarily identical to the category to be detected by the object detecting unit 103. For example, a case can be considered where the detection target categories to be detected by the object detecting unit 103 are categories of a human body and a car, and the object categories of region division are categories of sky, ground, building, a tree and other objects. In this case, <other object> category of region division contains both a human body and a car that are object detection target categories.

An example of a result obtained in step S110 is indicated as discrimination scores 804 in FIG. 5A, where the scores of the discrimination result obtained in the local region x in the object range are arranged. FIG. 4E illustrates the category with the maximum score among the discrimination scores obtained in each local region in a visualized manner. An alphabetical letter in the diagram indicates the name of the category with the maximum discrimination score in each region. The letters correspond to b: human body, g: grass, m: mountain, and s: sky, which are often used in the semantic region division field. Local regions to which encircled alphabets are assigned indicate that the local regions have erroneously discriminated.

In step S111, the region discriminating unit 105 converts the discrimination score of each category into a value in a range from zero to one, and adopts the value as a probability value. As a method of converting the score of the discriminating unit, such as a support vector machine, into a probability value, a technique, such as Non Patent Literature 5 (J. Platt, Probabilistic outputs for support vector machines and comparison to regularized likelihood methods, in A. Smola, P. Bartlett, B. Schoelkopf, and D. Schuurmans (eds.): Advances in Large Margin Classifiers. Cambridge, Mass., MIT Press, 2000), has been widely known. In the case of letting the resultant score of the support vector machine as "f", the method of Non Patent Literature 5 converts "f" into a probability value by the logistic function of the following Expression (1).

$$p(y=1|f)=1/(1+\exp(Af+B)) \quad (1)$$

Furthermore, the values are normalized such that the total sum of the values in all the categories are one, and the result is stored. Each of coefficients of "A" and "B" in Expression (1) is a parameter of the discriminant criterion, and preliminarily determined for each category using learning data and stored. More specifically, "A" and "B" are determined so as to minimize the error of the converted probability value from the true probability value. The details are to be referred to Non Patent Literature 5. An example of a result obtained in step S111 is indicated as a probability value 806 in FIG. 5A.

The thus obtained probability p is a conditional probability that the local region x falls in a certain category c under a condition that the detected object exists at a position where the local region x is included in the object range. Here, it is assumed that the object is a human body, and the probability is represented as $p(L_x=c|O_x=body)$. $L_x$ is the label of the category of the local region x.

Next, as with the above description, the object detecting score output from the object detecting unit 103 is converted into a probability value using the logistic function. It is assumed that the detected object is a human body, and the probability value is represented as $p(O_x=body)$.

The processes from step S106 to step S112 are performed for every detected object. After completion (No in step S105), the processing proceeds to step S113.

Step S113 to step S116 are processes of discriminating categories assuming that no objects exists in every local region in the image.

In step S113, the region discriminating unit 105 reads out the parameters of the general-purpose discriminant criterion from the region discriminant criterion storage unit 106.

In step S114, the region discriminating unit 105 calculates the feature quantities of all the local regions in the image. The method of calculating the feature quantities is the same as that in step S109. However, a feature quantity relatively determined based on the object detection result cannot be calculated. Consequently, a value of zero is substituted into such a quantity.

In step S115, the region discriminating unit 105 causes the support vector machine to calculate the discrimination score for each category as with step S110. At this time, the parameters of general-purpose discriminant criterion read out in step S113 are used. An example of a result obtained in step S115 is indicated as a discrimination score 809 in FIG. 5A. FIG. 4C illustrates the category with the maximum score among the discrimination scores obtained for each local region in a visualized manner.

In step S116, the region discriminating unit 105 converts each discrimination score into a probability value as with step S111, and stores the value. This value is a conditional probability that the local region x falls in the category c under a condition that no object exists at a position where the local region x is included in the object range. An example of a result obtained in step S116 is indicated as a probability value 811 in FIG. 5A. The probability value is represented as $p(L_x=c|O_x=\neg body)$. The symbol $\neg$ means negation. $O_x=\neg body$ means a condition that no human body exists at a position where the region x is included.

In step S117, the region discriminating unit 105 marginalizes and integrates the two probability values obtained by the above process using the following Expression (2), thereby finally obtaining a probability value $p(L_x=c)$. This process is executed by the category likelihood integrating unit 105c included in the region discriminating unit 105. Here, for simplicity, it is assumed that only the human body is the object to be detected, and calculation is performed.

$$p(L_x=c)=p(L_x=c|O_x=body)\cdot p(O=body)+p(L_x=c|O_x=\neg body)\cdot p(O_x=\neg body) \quad (2)$$

Here, the reason why the two probabilities in the cases of presence and absence of the human body are added together during integration is to consider, in a stochastic framework, the case where the human body is detected by the object detecting unit 103 but does not exist in actuality.

An example of a result obtained in the calculation is indicated as a probability value after integration 812 in FIG. 5A.

A category c* with the maximum value according to the following Expression (3) is regarded as the category of the local region x.

$$c^* = \mathrm{argmax}\, p(L_x = c) \quad (3)$$

Here, the category with the maximum probability value is the final result. Alternatively, another method may be adopted. For example, the category can be finally determined using a conditional random field as with Non Patent Literature 1. If the conditional random field is used, individual labels are determined so as to conform to surrounding labels, thereby exerting an advantageous effect of preventing local regions from being erroneously discriminated to be in an isolated manner.

Alternatively, still another method may be adopted. This method discriminates categories under a condition that an object exists not according to multi-class discrimination but according to two-class discrimination as to whether it is the foreground or background of the object. In this case, the determination under a condition that no object exists is performed according to multi-class discrimination (at least two classes) as it is. The two-class and multi-class discrimination scores are to be finally integrated. However, the following measure is required to integrate the discrimination score with different numbers of classes.

First, the foreground and background discrimination scores are each normalized into probability values. Next, the background probability value is uniformly divided, and regarded as a probability value of each of categories other than that of the human body. More specifically, this is according to the following Expression (4).

Probability value of each of categories other than the human body=background probability value/(the total number of categories−1)  (4)

An example of the thus obtained result of the probability value is indicated as a probability value 906 in FIG. 5B. Next, as illustrated in FIG. 5B, a weighted sum of the probability value 906 obtained by determination under the condition of presence of the object and a probability value 911 obtained by multi-class discrimination under condition of absence of the object is calculated, thereby acquiring a final probability value 912 of the category. The other method of integrating the two-class and multi-class discrimination scores has thus been described.

In step S118, the recognition result output unit 107 integrates the adjacent local regions falling in the same category into one region, which is regarded as an output result. FIG. 4F illustrates an example of the final output result. FIGS. 4E and 4C, which illustrate the intermediate examples of discrimination results, contain mis-discrimination. Note that in FIG. 4F, which illustrates the example of the result of integration of both the examples, mis-discrimination is appropriately corrected.

The operation of the recognition process in this embodiment has thus been described.

The method of integrating the region discrimination results is not necessarily limited to the framework using the conditional probability as described in this embodiment. Alternatively, for example, the category with the maximum score among discrimination scores of the region discriminating unit may be adopted. Alternatively, for example, a discrimination unit may be divided into that for the region in the object range and for the other regions, one local region may be discriminated by only one discriminating unit. Thus, various methods can be adopted.

(Description of Learning Process)

Next, a learning process of the parameters of the discriminant criterion used for determining the category of the object in the local region in this embodiment is described. In this embodiment, the parameters of two types of discriminant criteria, which are <object-specific discriminant criterion> for discriminating the region where the object is detected, and <general-purpose discriminant criterion> for discriminating the region where no object is detected, are learned. The learning process of this embodiment roughly includes the following three processes.

(1) Data in the local region is sorted according to presence or absence of detection of the object, and each type of the object.

(2) The parameters of the discriminant criteria are learned, based on the divided learning data.

(3) The parameters of the discriminant criteria are stored.

Figure 8A:
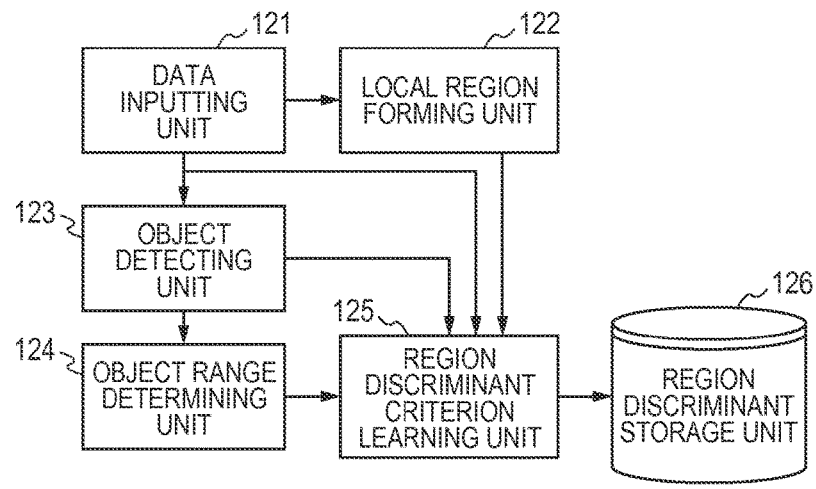
FIGS. 8A and 8B are diagrams illustrating configurations of image recognizing apparatuses.

FIG. 8A illustrates an example of the configuration for learning by the image recognizing apparatus. This configuration is different from that in FIG. 1 in that a region discriminant criterion learning unit 125 is included instead of the region discriminating unit 105, and absence of the recognition result output unit 107. The data input unit 121, the local region generating unit 122, the object detecting unit 123, the object range detecting unit 124 and region discriminant criterion storage unit 126 are analogous to those in FIG. 1.

Figure 9A:
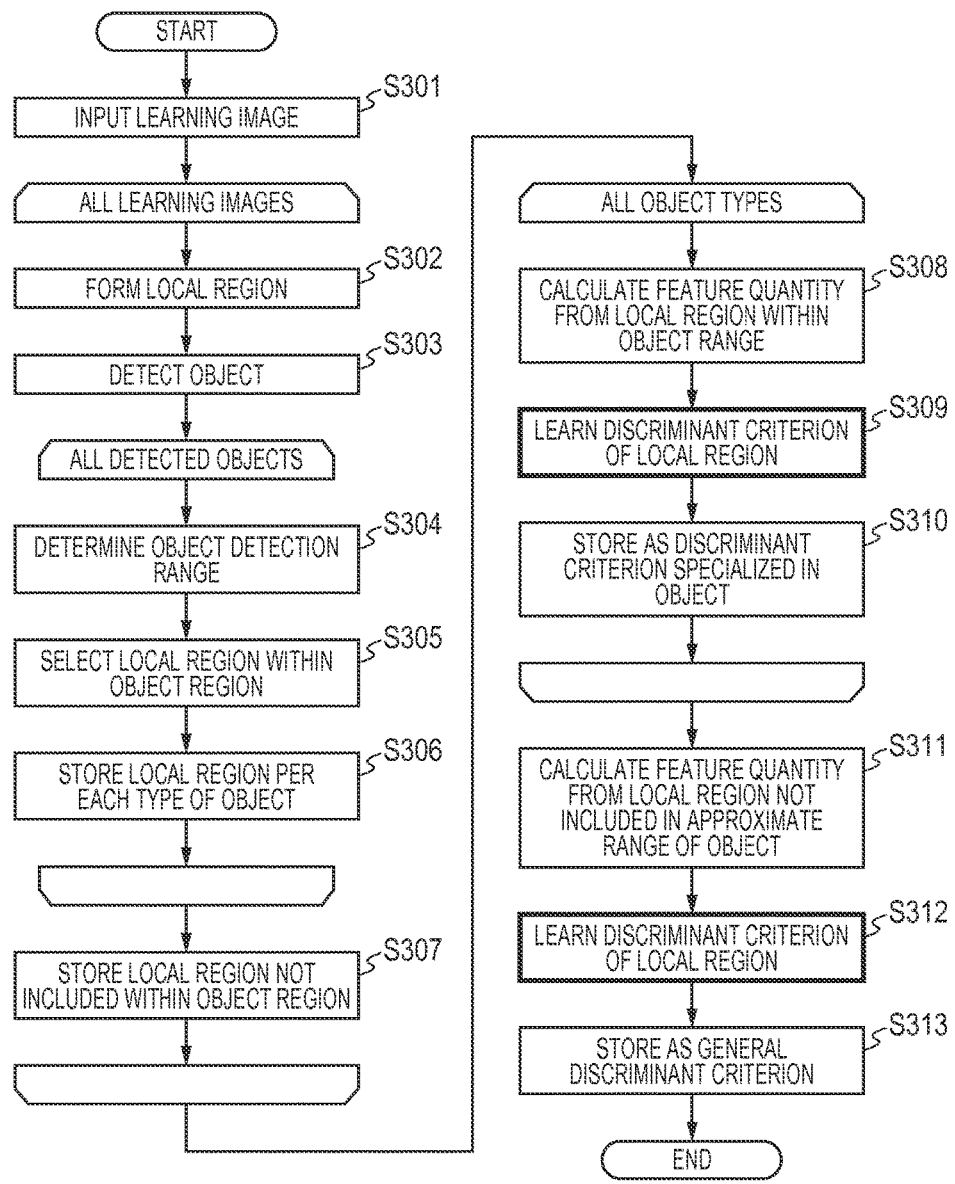
FIGS. 9A and 9B are flowcharts illustrating the flow of a learning process in the first embodiment.

FIG. 9A is a flowchart illustrating the flow of the learning process in this embodiment. The learning process is described also with reference to FIG. 8A.

In step S301, the data input unit 121 receives learning images.

In step S302, the local region generating unit 122 generates local regions for all the learning images. This process is the same as the process executed in step S102 of the recognition process.

In step S303, the object detecting unit 123 detects an object taken in each learning image.

The following processes of steps S304 to S306 are performed to all the thus taken objects.

In step S304, the object range detecting unit 124 determines the object range for each detected object. In step S305, the region discriminant criterion learning unit 125 identifies and selects the local region in the object range. In step S306, the region discriminant criterion learning unit 125 integrally stores the local regions for each type of object as learning data to be used in learning later.

In step S307, the local region that is not included within any object range is selected, and separately stored as learning data in an analogous manner.

Thus, the data on local regions are divided for each type of the detected object. Here, for example, three types of local regions, which are the local region included in the object range of the human body, the local region included in the object range of the car, and the local region that is not included in any of human body or the car, are extracted from all the images and separately stored.

Next, these are adopted as learning data, the parameters of the discriminant criterion for discriminating the category of the object in the local region is learned for each type of object. Thereby, the following processes of steps S308 to S311 are executed for each type of object for the learning.

In step S308, the region discriminant criterion learning unit 125 calculates the feature quantity from each local region. In step S309, the region discriminant criterion learning unit 125 receives the feature quantity as input, and learns the parameters of the discriminant criterion so as to correctly discriminate the category with the true value of the category of the object in each local region being regarded as an output target value. The category of the local region is a discrimination target category of predetermined semantic region division, such as a mountain, sky, grass, a human body or the like. The true value is preliminarily provided as a teaching value.

Figure 9B:
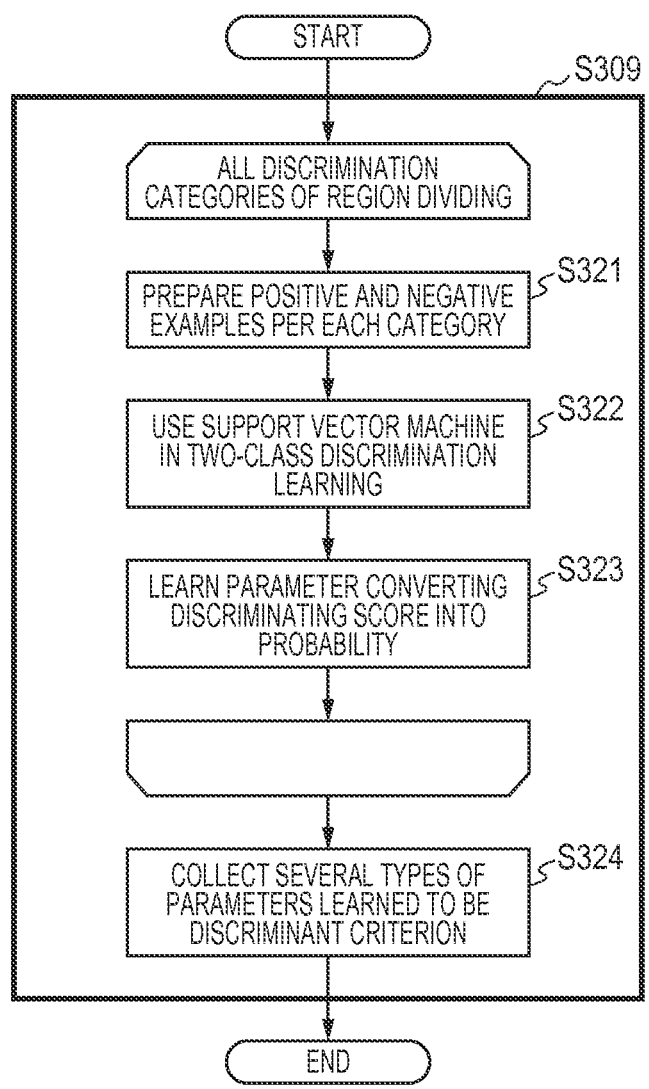

Here, the learning process of the parameters of the discriminant criterion in step S309 is described in detail with reference to FIG. 9B. As described above for the recognition process, this embodiment uses the support vector machine for multi-class discrimination of the local region. More specifically, two-class discrimination support vector machines as many as the number of discrimination target categories of region division are used to achieve a multi-class discriminating unit.

Here, the processes of step S321 to step S323 are repeated for each discrimination target category, thereby learning each support vector machine.

In step S321, the local regions corresponding to the positive and negative examples of the categories are extracted from the learning data to create two-class data. In step S322, the data on the positive example and negative example obtained in the previous step is supplied to the support vector machine, and the two-class discrimination is learned. In step S323, a function for converting the discrimination score of the support vector machine obtained in the above learning into a range from zero to one and obtaining the probability value is learned. As described above, the method of Non Patent Literature 5 is used here. This process is performed for every discrimination target category. In step S324, both of the set of all the support vectors, and the set of the parameters of the logistic function for converting the discrimination score into the probability value obtained in steps S321 to S323 are integrally collected as the parameters of the discriminant criterion, and output. The detailed flow of the process of step S309 has thus been described above. The processes can obtain the parameters of the discriminant criterion for discriminating the local region in the object range with respect to the type of one certain object to be detected.

In step S310, the parameters of the discriminant criterion obtained above are stored as the object-specific discriminant criterion for each type of object, in the region discriminant criterion storage unit 126.

The learning processes from steps S308 to S310 are performed for every type of object. After completion, the processing proceeds to the next step S311.

Next, the general-purpose discriminant criterion for determining the region where no object is detected is learned. More specifically, in step S311, the region discriminant criterion learning unit 125 calculates the feature quantity from the local region that is not included in the object range. In step S312, the parameters of the discriminant criterion are learned by performing a process analogous to the process of step S309. Here, the process of step S312 is different from the process of step S309 only in that the former uses the local region where no object is detected, as data to be learned. In step S313, the parameters of the discriminant criterion obtained above are stored as the general-purpose discriminant criterion, in the region discriminant criterion storage unit 126.

The operation of the learning process in this embodiment has thus been described above.

Another mode is hereinafter described.

(Another Mode Related to Learning of Parameters of Discriminant Criterion)

To improve the recognition accuracy, a mode is herein described that divides the type of the detected object in detail into subclasses based on the orientation and direction of the object, and learns the parameters of the discriminant criterion for the region specialized to each subclass.

Figure 6B:
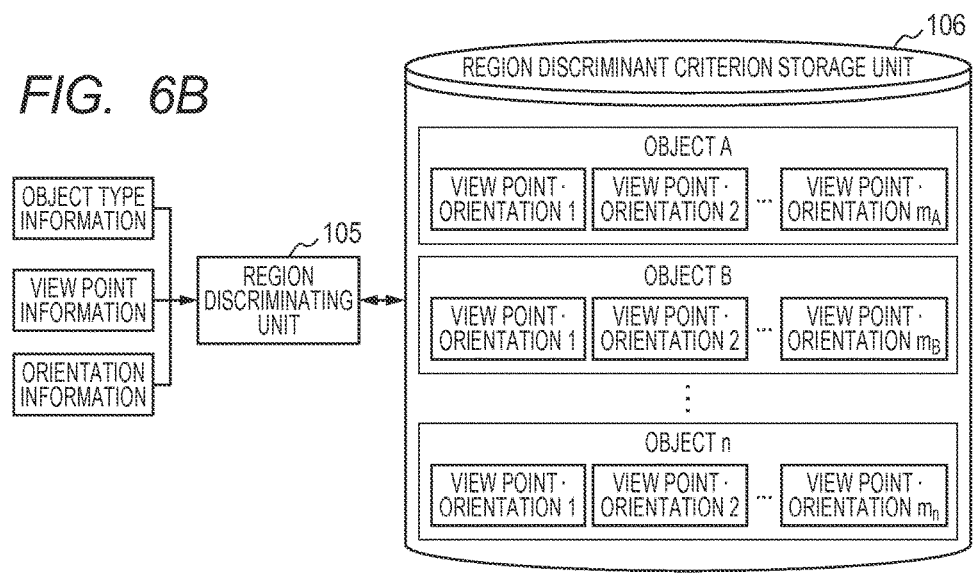

As one mode of learning the parameters of the discriminant criterion for the region with respect to each subclass, a mode is described that prepares the parameters of the discriminant criterion for each of the direction (herein called a view point) of the detected object and the property of the object, such as orientation. As illustrated in FIG. 6B, the parameters of the discriminant criterion are finely divided and prepared for each object, and for each view point and orientation of the object, and stored in the region discriminant criterion storage unit 106. For recognition, the region discriminating unit 105 reads out and uses the parameters of the discriminant criterion for the appropriate subclass of the object. Consequently, for example, in each of the case of discriminating the region of a human body in a seated orientation and the case of discriminating the region of the standing human body from behind, the parameters of the appropriate discriminant criterion suitable for the case can be selected and used.

FIG. 10A is a flowchart illustrating the flow of the learning process. The learning process will be described also with reference to FIG. 8A. At this time, the same description as that of the learning process having been described is omitted. Note that description is herein made assuming that only a certain type of object is divided in detail into subclasses.

Steps S201 and S202 are analogous to the respective steps S301 and S302 in FIG. 9A.

In step S203, the object detecting unit 123 performs object detection for the target object in all the learning images. The estimation results of the view point and orientation of the object are stored.

In step S204, the region discriminant criterion learning unit 125 vector-quantizes the view point and orientation of the detected object in all the learning images, and creates multiple subclasses. More specifically, in a parameter space of the view point and orientation, the data is divided into m clusters using the k-mean method. Note that a user preliminarily determines an appropriate number as m such that the number of learning images in each subclass is not too small.

In step S205, the region discriminant criterion learning unit 125 divides the local region in the learning image for each subclass.

In step S206, the region discriminant criterion learning unit 125 individually performs learning based on the data on each subclass, and obtains the parameters of the discriminant criterion for each subclass.

In step S207, the region discriminant criterion learning unit 125 stores the parameters of the discriminant criterion for each subclass, as illustrated in FIG. 6B. At this time, the value of the representative vector (not illustrated) of the view point and orientation for search are also assigned to each subclass.

The flow of the process of learning the discriminant criterion for each subclass, such as the orientation and direction of the object has thus been described above.

FIG. 10B is a flowchart illustrating the flow of the recognition process. The recognition process will be described also with reference to FIG. 1. At this time, the same description of the processes in the recognition process as have already been described above is omitted.

Steps S211 and S212 are analogous to the respective steps S101 and S102 in FIG. 3.

In step S213, the object detecting unit 103 estimates the type of object, and the view point and orientation of the object.

In step S214, the region discriminating unit 105 reads out the parameters of the corresponding discriminant criterion. At this stage, the set of parameters of discriminant criterion prepared for each object is read out.

In step S215, the region discriminating unit 105 compares the information on the view point and orientation of the object obtained in step S213 with the representative vector assigned to the set of parameters of discriminant criterion, and selects the closest representative vector.

In step S216, the region discriminating unit 105 reads out the parameters of discriminant criterion in the subclass corresponding to the closest representative vector.

In step S217, the region discriminating unit 105 discriminates the category of the object in the local region using the read parameters of discriminant criterion.

The flow of the process of reading out the parameters of discriminant criterion in the region for each subclass of the object and performing recognition has thus been described above.

Any property other than the view point and orientation have been described may be used to generate the subclass of the object. For example, the learning data may be clustered according to difference in appearance of the detected object, and used as subclass. Alternatively, for example, if the target object is an animal, such as a dog, learning data for each dog type may be provided, and the subclass may be created based on the data.

If the object detecting unit 103 erroneously estimates the view point and the orientation of the detected object, the parameters of the inappropriate discriminant criterion are read out, thereby causing a risk of erroneously discriminating the region thereafter. A mode that can solve the problem is described below.

When the object detecting unit 103 estimates the property of the object, this unit outputs the reliability score of the estimation value of the property together. As the method of calculating the reliability score of estimating the property of the object, for example, the discrimination score may be used as the reliability score in the case of the support vector machine that is the standard discrimination method. In the case of a stochastic discriminating unit, the likelihood of property may be used as the reliability score. At the time of recognition, if the reliability score of the property of the object is less than a predetermined threshold, the parameters of the discriminant criterion for the subclass are not read out and the subclass is not discriminated. Instead, the parameters of the general-purpose discriminant criterion having already learned are read out, and learning is performed based on the parameters. The above process can prevent an error that reads the parameters of the inappropriate discriminant criterion and discriminates the region.

There may be another problem in that it is sometimes difficult to obtain the degree of reliability of the property of the object. In such a case, a mode can be considered, in which the subclass is not determined during recognition, and the parameters of the discriminant criteria of all the subclasses are used to perform discriminations multiple times as many as the number of all the subclasses having preliminarily prepared, and the result with the highest likelihood is adopted from among all the discrimination results.

The mode for reducing the adverse effects of erroneous estimation of the subclass in the case of recognition using the subclass of the object has thus been described above.

Figure 11:
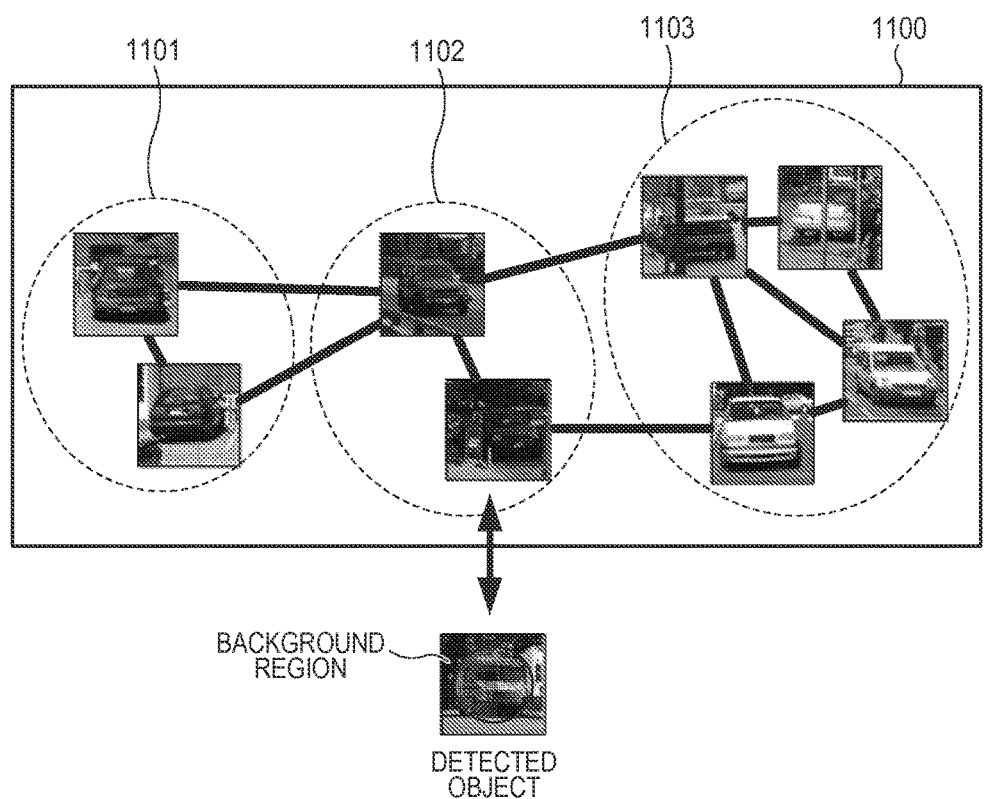
FIG. 11 is a diagram illustrating a concept of a method of creating subclasses using a background of an object.

As a second mode of learning the parameters of the discriminant criterion in the region for each subclass, a mode of creating the subclass using the background of the object will be described. FIG. 11 illustrates the concept of the method of creating the subclass using the background of the object.

In this mode, the following procedures are performed in the learning process. First, the target object is detected from the learning image. Next, an image region having a predetermined size is extracted centered at the target object, and the extracted region is adopted as learning data. Next, a region apart by a predetermined number of pixels from the center of the detected object is regarded as a background region, and the feature quantity is extracted from the background region. Next, the learning data is clustered based on the degree of similarity of the feature quantity of the background to create multiple subclasses. The clustering method will be described later. The parameters of the discriminant criterion are learned for each subclass and individually stored. At this time, at least one data item from each subclass is sampled as a representative vector, which is to be a sample, and the representative vector of the data item is stored together.

In the recognition process, the background region of the detected object in the input image is obtained by a process analogous to the learning process, and the feature quantity is extracted from the background region. The feature quantity is compared with the each representative vector having been previously stored, and the subclass to which the object belongs is identified. Next, the parameters of the discriminant criterion in the subclass concerned are read out, the category of the object in the local region is determined.

The details of the clustering method during learning are as follows. First, the color distribution of the background is adopted as the feature quantity, and the Euclidean distance between feature quantities is adopted as the distance between learning data items to create graph data. Next, spectral clustering is performed on the graph data to divide the learning data into a predetermined number of clusters. An example of the graph data and division result are indicated as the graph data 1100 and background subclasses 1101, 1102 and 1103 in FIG. 11. An example of a result is herein illustrated where three subclasses are generated from image data on a car according to the degree of similarity of the background. In the example illustrated in the diagram, the distance between data items is represented by the length of the edge between the nodes. The distance between data items apart by at least a predetermined threshold is regarded as infinity and no edge is illustrated. The method of spectral clustering is a widely, publicly known technique. For example, the method is disclosed in Non Patent Literature 6 (F. Bach, M. Jordan, Learning spectral clustering, Advances in Neural Information Processing Systems 16, pp. 305-312, 2004). Consequently, the details are omitted.

The advantageous effects of this mode are qualitatively described as follows. For example, it is assumed that a car parking in town and a car running on a snowy road are separately learned as in different classes. It is further assumed that a car is then detected from an input image, and there is a silver local region around the car. If the car is determined to be in a subclass for the car in town based on the feature of the background, it is highly possible that the silver region is regarded as the foreground (metal part) of the car. On the contrary, if it is determined as in the subclass for the snowy road, the possibility that the region is regarded as the background (snow) becomes relatively high. This mode adaptively changes the parameters of the discriminant criterion for the region according to the situations around the object (such as town or a snowy road). Consequently, even if the background varies, the foreground and the background can be correctly discriminated from each other.

(Other Modes Related to Determination of Object Range)

Other modes of the method of determining an object range are herein described. For instance, an example is described that determines the object range regarding a human body as a target object. However, the object is not necessarily limited to the human body.

As a first mode of determining the object range, a mode of determining the object range based on the prior distribution of the detected object is described. FIG. 7B illustrates a prior distribution 502e that represents the shape of the object using contours. Specific procedures for calculating the prior distribution are as follows. First, the object is detected from a learning image. The frequency that each pixel around the detection window 502b is contained in the foreground region of the object is tallied with reference to the detection window 502b of the object, and the probability value is obtained for each pixel. The value is regarded as the prior distribution 502e of the shape of the object.

This mode regards, as the object range, the pixel having a prior distribution value of at least a predetermined threshold. In FIG. 7B, an object range 502d obtained by binarizing the prior distribution with reference to a threshold is indicated by a thick line.

This mode can determine, as the range concerned, a necessary and sufficient range more fitted to the shape of the human body. Consequently, it is expected that the discrimination accuracy can be improved and the amount of computation can be reduced.

As a second mode of determining the object range, a mode is described where the recognition method in the object detecting unit 103 is a method of recognition using multiple partial templates. As illustrated in FIG. 7C, total six partial templates are each detected at a position matching a predetermined portion. In FIG. 7C, only a template 503e for a head is indicated by a symbol assigned thereto.

In this mode, the object range detecting unit 104 enlarges each of the six partial template by a predetermined number of pixels, and the range of union 503d is adopted as the object range.

As a third mode of determining the object range, an object detecting method that estimates the skeletal frame of the object, for example, in Non Patent Literature 7 (A. Agarwal, B. Triggs, Recovering 3D human pose from monocular images. IEEE Transactions on Pattern Analysis & Machine Intelligence, Vol. 28, pp. 44-58, 2006) can be considered as illustrated in FIG. 7G. In this case, a skeletal frame 507e output from the object detecting unit 103 is expanded by a predetermined number of pixels, and adopted as an object range 507d.

As a fourth mode of determining the object range, a mode of using the prior distribution of the partial template will be described. In this mode, as with the second mode, the object detecting unit 103 detects multiple partial templates, thereby allowing the positions to be obtained. As illustrated in FIG. 7D, the region of the prior distribution of the human body is preliminarily created for each partial template 504e. This mode tallies the prior distribution for each partial template according to a method analogous to the method of tallying the prior distribution based on the detection window 502b in the first mode. Next, the region of the prior distribution is arranged for each partial template. The union 504d of the regions is adopted as the object range.

As a fifth mode of determining the object range, a mode will be described that divides the object into subclasses for each of the view point and orientation, and tallies the prior distribution for each subclass, thereby obtaining the object range. FIG. 7F illustrates an example of the prior distribution in such a subclass. This prior distribution obtained by tallying from a sitting human body 505a with a leftward direction as illustrated in FIG. 7E. A detection window 505b for an object and an object range 505c are illustrated. A prior distribution 506e in FIG. 7F is largely different from the prior distribution 502e of the standing human body in FIG. 7B. A detection window 506b for an object is illustrated. The shape of prior distribution of an object having high flexibility of the four limbs, such as a human body, is largely changed. Thus, if the necessary and sufficient object range 506d can be determined for each subclass of the orientation as with this mode, the accuracy of the local region thereafter can be improved.

(Feature Quantity Relatively Determined Based on Object Detection Result)

The feature quantity determined based on the object detection result, which has not been described in detail, is herein described in detail.

As a first mode of calculating the feature quantity of the local region, a mode of using coordinate values centered at the detected object. As illustrated in FIG. 12A, the position of a local region 701f is obtained as a position (x', y') of coordinates centered on an object 701a, and adopted as the feature quantity of the local region 701f having two elements. (x', y') are coordinate values normalized according to the object size such that the center of the object range 701c is (0, 0) and the upper right of the object range 701c is (1, 1). If the object range is not rectangle but an indefinite shape, the coordinate values may be calculated using a rectangle circumscribed to the object range in a similar manner.

The two-dimensional feature quantity representing the position is additionally linked and added to the feature quantity vector of the local region. The support vector machine for discriminating the local region is learned based on the linked feature quantity. Consequently, the category of the object in the local region can be discriminated in consideration of information on the size of the object and the portion of the object. For example, even with the same black local region, the region around the head of a human body indicates a high possibility that the region is the hair of the human body. Consequently, the support vector machine tends to discriminate that the region is the category for the human body. On the other hand, the region around the feet of the human body indicates a high possibility that the region is a shadow on a road. Consequently, the region tends to be discriminated as the ground.

As a second mode of calculating the feature quantity of the local region, a mode of using the degree of similarity between regions will be described. As illustrated in FIG. 12B, the degree of similarity between the prior distribution 702e of the object and a local region 702f is calculated, and adopted as the feature quantity of the local region 702f. The degree of similarity between a range 702g (broken line outer frame range) of the background of the object and the local region 702f is calculated and adopted as the feature quantity of the local region 702f. A reference 702c denotes an object range. Note that there is another human body in addition to the human body that is currently focus of attention. If the object range of the other body overlaps with the range 702g of the background region, the region is removed from the range 702g of the background region, and then the degree of similarity is calculated.

Note that the degree of similarity here may be histogram intersection of color or texture distributions in the two ranges. The above two-element degree of similarity feature quantity is represented in the following Expression (5).

Degree of similarity feature quantity=[foreground degree of similarity, background degree of similarity]$^T$ Foreground degree of similarity(local region $x$)=$h(f$ (local region $x$),$f$(object prior distribution region))

Background degree of similarity(local region $x$)=$h(f$ (local region $x$),$f$(object background region))    (5)

The symbol T in the expression indicates the transpose of a vector. The h(q, r) is the value of the histogram intersection between vectors q and r. The h may be the Euclidean distance, the chi-square distance, or the reciprocal of KL-divergence. f(z) is a function of returning the vector of the following Expression (6) that links the RGB value histogram in the range z in the image and the texture codebook histogram. The texture codebook histogram has been widely, publicly known for example in Non Patent Literature 4. Consequently, the detailed description is omitted.

$f(z)$=[RGB color histogram$^T$ in range $z$,texture histogram$^T$ in range $z$]$^T$    (6)

Use of the degree of similarity can add information on the degree of similarity for individual object detected during recognition as to whether each local region has a feature similar to that of the foreground of the object or to that of the background. Consequently, it can be expected that the accuracy of discriminating whether the region is the foreground or background can be improved in comparison with the case of learning whether the local region is the foreground or background of the object based only on the absolute value of the color or texture distribution.

Another method of calculating the degree of similarity is described with reference to FIG. 12C. FIG. 12C illustrates the case of dividing the region including the object range 703c into 5×7 blocks 703g, calculating the degree of similarity of each block 703g and local region 703f, and obtaining 35-dimensional vector.

Still another method of calculating the degree of similarity is described with reference to FIG. 12D. This example calculates the degree of similarity between the region of six parts (only a head part is indicated by the symbol 704e) and a local region 704f, and adds the similarity as the six-dimensional feature to the feature quantity of the local region 704f. Alternatively, the degree of similarity between each background range 704g (broken line outer frame range) of the object and the local region 704f may be added to the feature quantity. An object range 704c is illustrated. In the diagram, an example of the background ranges 704g having divided into four is indicated by broken lines. Such use of the feature quantity of the part-based degree of similarity can be expected to provide a clue for discriminating the foreground and background from each other in the case of a hand where a part with a similar color distribution (face or the opposite hand) resides at a position apart from the hand. The degrees of similarity with the background parts described above are thus adopted as the feature quantities, which can prevent mis-discrimination even if the region similar to that of the part of the human body is included in the part of the background region.

Yet another method of calculating the degree of similarity is described with reference to FIG. 12E. This method is similar to the method illustrated in FIG. 12D. The skeletal frame of an object is estimated. The degree of similarity between a predetermined region 705e (a circular region in the diagram; a symbol is assigned only to the region around the head) whose position is defined with respect to the skeletal frame of the object and a local region 705f is calculated and adopted as the feature quantity. The local region 705f can be compared with each of the regions 705e on the skeletal frame of the object as to whether color or texture is similar or not. Consequently, it can be discriminated in detail whether the local region 705f is the background region or a part of any of clothes and hands of the human body based on learning.

Second Embodiment

A second embodiment of the present invention is described. As with the first embodiment, the second embodiment receives the two-dimensional image data as an input image, and recognizes the category of an object in the image and its region. Note that the second embodiment has an object to correctly extract the regions of predetermined target objects, such as a human body, a horse and a car. All the regions of the categories of objects other than the target objects are regarded as the background region, and the regions are not discriminated from each other.

Figure 13A:
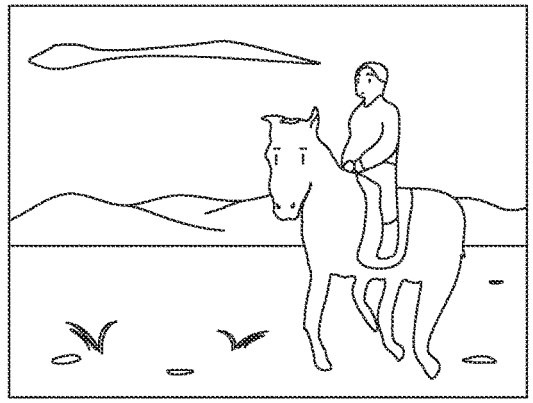
FIGS. 13A, 13B and 13C are diagrams illustrating results of a recognition process in a second embodiment.
Figure 13B:
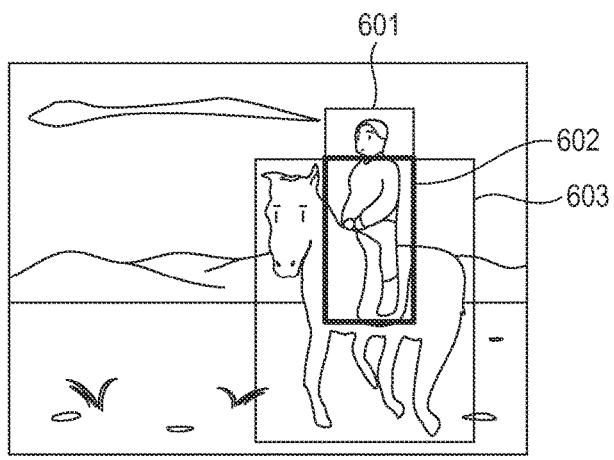

This embodiment specifically emphasizes correct discrimination as to which object a region corresponds to in the case where the target objects overlap with each other. FIG. 13A illustrates a simple and direct example of a target to be image-recognized in this embodiment. The diagram illustrates an image of a person riding a horse. It is generally difficult to discriminate to which object a local region in an overlapped region 602 of objects as illustrated in FIG. 13B belongs, or whether it belongs to a background region rather than the objects.

This embodiment regards the region 602 where the human body and the horse overlap with each other as described above as one independent category different from the categories of the region 601 of the human body and the region 603 of the horse. More specifically, data items only with overlapped regions are collected to create learning data, and the parameters of a discriminant criterion specialized to the overlapped region of the human body and the horse are learned and used. Consequently, the feature common to the way of overlap between the human body and the horse is learned, thereby allowing the category of the object in the overlapped region to be correctly discriminated.

The configuration of the image recognizing apparatus according to a second embodiment is analogous to the configuration of the first embodiment. It is herein assumed that three objects A, B and C are defined as object categories to be recognized. The object detecting unit 103 is provided with functions of detecting the three objects A, B and C.

(Description of Learning Process)

The learning process of this embodiment learns discriminant criteria, which are roughly classified into two types. One is a discriminant criterion for discriminating the local region in the object range of a single object. The other is a discriminant criterion for discriminating the local region in the overlapped region of two objects.

The learning process of the first discriminant criterion is analogous to the process of the first embodiment. Detailed description is herein omitted to avoid repetition. Total four discriminant criteria are finally obtained. That is, the criteria correspond to the parameters of three discriminant criteria having learned with an assumption that the objects are detected as the objects A, B and C, and the parameters of one discriminant criterion having been learned with an assumption that no object has been detected. Here, the parameters of the discriminant criterion having been learned with the assumption that no object has been detected are called a general-purpose discriminant criterion as with the first embodiment.

The learning process of the second discriminant criterion is specific to this embodiment, and performs the following procedures. First, the object detecting unit 103 detects all the objects A, B and C in the entire learning data, and the object range detecting unit 104 determines the object range for each detected object. Next, pairs of all combinations of object categories are created. Here, three pairs, or objects A-B, A-C and B-C, are created. Next, it is determined whether or not there is a range where object ranges overlap with each other based on the position coordinates and sizes of the object ranges of all the objects in the learning image. If any, such regions are extracted, separated into three pairs of objects, and stored. Consequently, learning data items are created to the respective pairs of objects with overlapped regions. Next, the discriminant criterion for the region is learned for each pair of objects.

The details of learning of the discriminant criterion for the overlapped region of the object pair is as follows. Here, the case is exemplified that learns the discriminant criterion for the overlapped region of the object pair A-B. When a local region x in the overlapped region of the objects A and B is discriminated, there is a possibility that the alternatives of output may be four categories that are objects A, B and C and background. As with the first embodiment, four support vector machines are prepared for the respective four categories. Positive example data and negative example data according to the categories are provided. Each support vector machine performs two-class discrimination learning. Consequently, if the feature quantity of the local region in the overlapped region is input during recognition, the discrimination scores representing the likelihoods of the respective four categories are output.

Figure 6C:
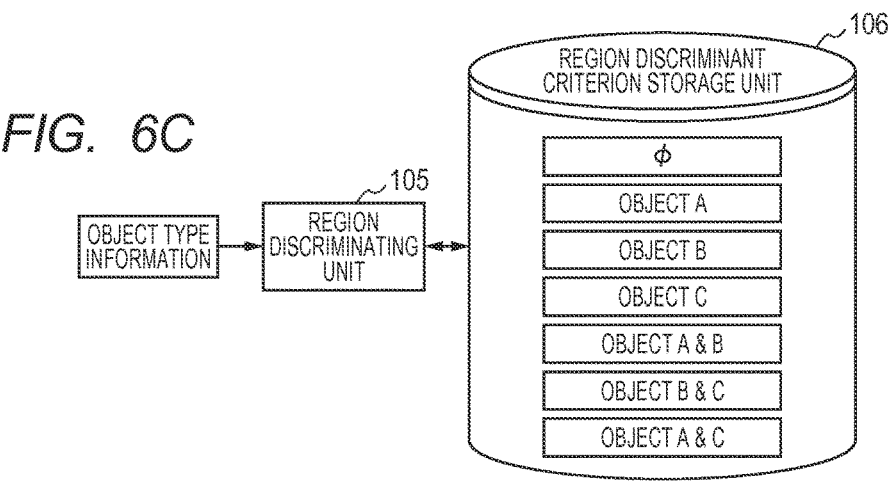

Total seven sets of the parameters of the discriminant criteria are obtained. As illustrated in FIG. 6C, the sets include the parameters of one general-purpose discriminant criterion, the parameters of the discriminant criteria for the three object categories, and the parameters of the discriminant criteria of three overlapped regions of object pairs. The parameters of the discriminant criteria include the parameters of four support vector machine (not illustrated) corresponding to the respective four categories of regions, which are the objects A, B and C, and the background. In addition to the above configuration, parameters for converting the discrimination score of the support vector machine into a probability value are also included. Here, the parameters for conversion into the probability value are the parameters of logistic function obtained by a method similar to that of the first embodiment.

(Description of Recognition Process)

Figure 14:
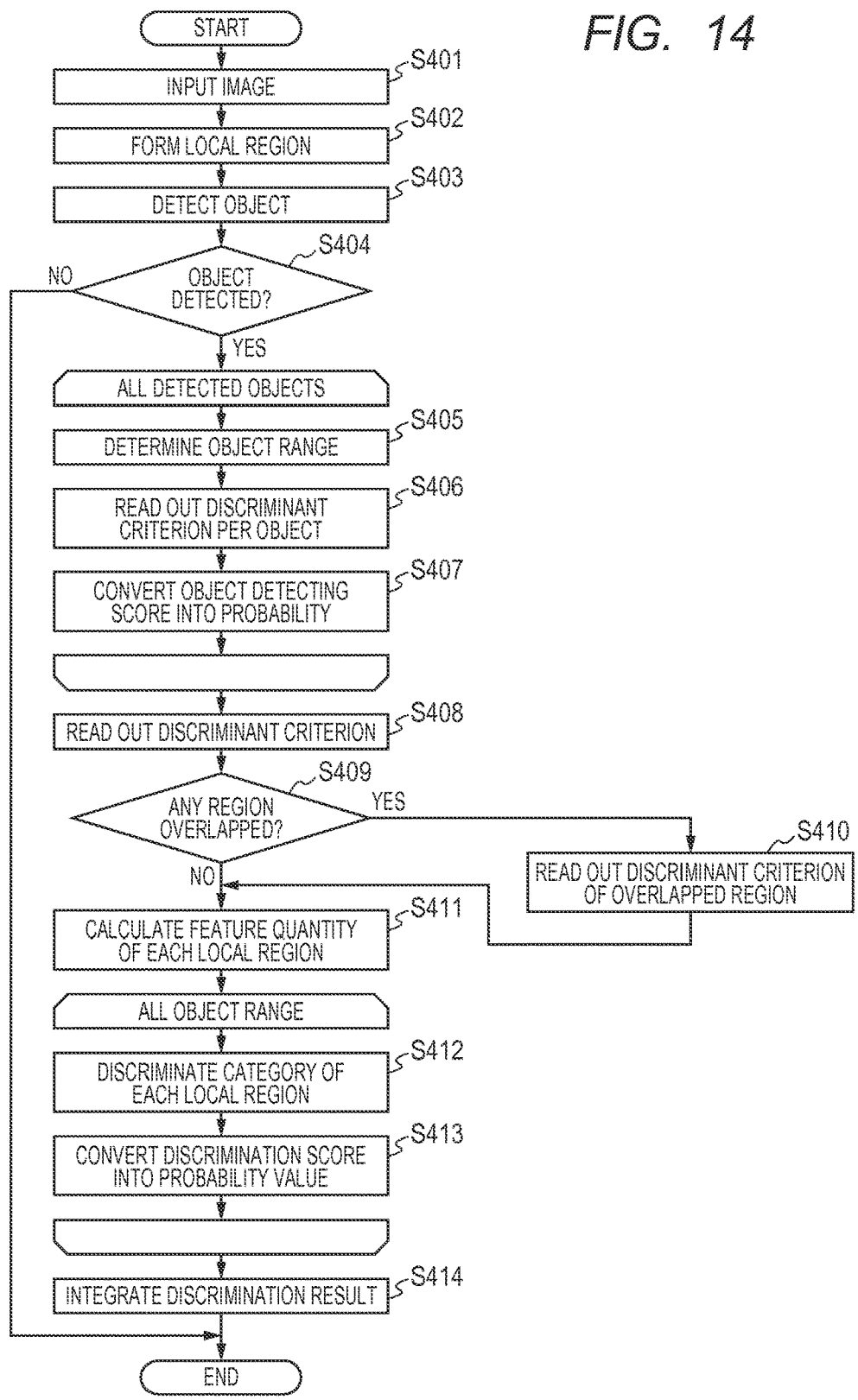
FIG. 14 is a flowchart illustrating the flow of the recognition process in the second embodiment.

FIG. 14 is a flowchart illustrating the flow of a recognition process in this embodiment. The recognition process is described also with reference to FIG. 1. For simplicity, it is herein assumed that the categories for recognition target objects are limited only to two types which are a human body and a horse, and description is made.

This embodiment is different from the first embodiment in that this embodiment adopts only the objects as target categories but does not discriminate the background.

Steps S401 and S402 are analogous to the respective steps of S101 and S102 in FIG. 3.

In step S403, the object detecting unit 103 performs the recognition process as to whether predetermined objects that are the human body and horse in this case are in an input image or not.

In step S404, it is determined whether any of the objects (human body and horse) have been detected or not in step S403. If the object has been detected, the processing proceeds to step S405. If no object has been detected, the recognition process is finished there.

In step S405, the object range detecting unit 104 determines the object range of each object.

In step S406, the region discriminating unit 105 reads out the parameters of discriminant criterion from the region discriminant criterion storage unit 106. At this time, the parameters of the discriminant criterion are read out for each of object types, which are the human body and the horse in this case.

In step S407, as with the first embodiment, the region discriminating unit 105 converts the discrimination score of each detected object into a range from zero to one, thus obtaining the range as the estimation value of the probability of presence of the object.

In step S408, the region discriminating unit 105 reads out the parameters of the general-purpose discriminant criterion from the region discriminant criterion storage unit 106.

In step S409, the region discriminating unit 105 checks whether there is any overlapped region between the object ranges based on the position coordinates and size of the object range in the input image. If there is any overlapped region between objects falling in different categories, the processing proceeds to step S410.

In step S410, the region discriminating unit 105 reads out the parameters of discriminant criterion specialized to the overlapped region obtained in the learning process, which are the parameters of the discriminant criterion of the overlapped region of the human body and the horse in this case, from the region discriminant criterion storage unit 106.

In step S411, the region discriminating unit 105 calculates the feature quantities of the local regions in all the object ranges.

In step S412, the region discriminating unit 105 causes the support vector machine to discriminate the regions for each type of object ranges. The types of object ranges in this case are three types that are the object range of human body, the object range of horse, and the overlapped region of the human body and horse. The category of the region where no object overlap with each other is discriminated according to the same method as that of the first embodiment. In step S413, the probability value is obtained. For example, the probability of each category of the local region x in the object range where only the human body is detected is obtained by the following Expression (7).

$$p(L_x=c)=p(L_x=c|O=\text{body})\cdot p(O=\text{body})+p(L_x=c|O=\neg\text{body})\cdot p(O=\neg\text{body}) \quad (7)$$

where c is any of three categories, which are for the human body, horse and background.

Furthermore, the probability value of each category of the region where the object ranges of the human body and the horse overlap with each other is obtained according to the following Expression (8).

$$p(L_x = c) = p(L_x = c \mid O_x = \text{body \& horse}) \cdot p(O_x = \text{body \& horse}) + \quad (8)$$
$$p(L_x = c \mid O_x = \text{body \& } \neg \text{horse}) \cdot p(O_x = \text{body \& } \neg \text{horse}) +$$
$$p(L_x = c \mid O_x = \neg \text{body \& horse}) \cdot p(O_x = \neg \text{body \& horse}) +$$
$$p(L_x = c \mid O_x = \neg \text{body \& } \neg \text{horse}) \cdot p(O_x = \neg \text{body \& } \neg \text{horse})$$

where c is any of three categories, which are for the human body, horse and background. The conditional probability $p(L_x=c \mid O_x=\text{body\&horse})$ of the first term on the right side is obtained by acquiring the discrimination score of the local region x using the parameters of the discriminant criterion learned to discriminate the overlapped region of the human body and horse and then converting the score into the probability value.

The conditional probability $p(L_x=c \mid O_x=\text{body\&} \neg \text{horse})$ of the second term is a probability value obtained using the parameters of the discriminant criterion acquired by learning in the region where only the human body is detected, and is identical to the conditional probability on the first term on the right side of Expression (7) (the representation is changed from Expression (7)). Likewise, the conditional probability on the third term is a probability value obtained using the parameters of the discriminant criterion learned in the region where only the horse is detected. The conditional probability of the fourth term is a probability value obtained using the parameters of the general-purpose discriminant criterion learned in the region where no object is detected.

$p(O_x=\text{body\&horse})$ on the first term is a prior probability of true presence of two objects in the case where two objects, which are the human body and the horse, are detected by the object detecting unit 103 at the same time. This value is a product of the probabilities of presence of the objects obtained in step S407. That is, if the following Expression (9) is satisfied, the prior probability of each term can be calculated according to the following Expression (10).

$$p(O_x=\text{body})=0.7$$
$$p(O_x=\text{horse})=0.6 \quad (9)$$
$$p(O_x=\text{body\&horse})=0.7 \times 0.6=0.42$$
$$p(O_x=\text{body\&} \neg \text{horse})=0.7 \times (1-0.6)=0.28 p(O_x=$$
$$\neg \text{body\&horse})=(1-0.7)\times 0.6=0.18 p(O_x=$$
$$\neg \text{body\&} \neg \text{horse})=(1-0.7)(1-0.6)=0.12 \quad (10)$$

Note that the prior probability is obtained assuming that the probabilities of presence of two objects are independent from each other.

Calculation based on the above expressions demonstrate that the discrimination results can be integrated according to the stochastic framework, even for the region where objects overlap with each other.

Figure 13C:
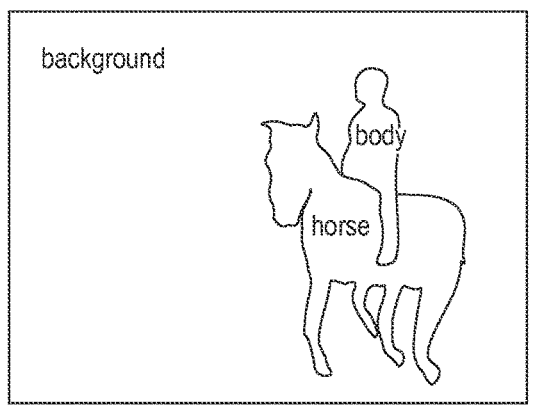

In step S414, the recognition result output unit 107 integrates the thus obtained discrimination results of the local regions in the three object ranges, which are the object range of the human body, the object range of the horse, and the object range of the overlapped region. More specifically, the category with the maximum likelihood in each local region is adopted as a label for the local region. As with the first embodiment, the adjacent regions in the same category are integrated into a single region, which is then output. FIG. 13C illustrates an example of a recognition result of this embodiment.

Thus, according to the second embodiment, even in the case of the target in which the objects overlap and which is difficult to be discriminated, the region can be more correctly discriminated using the parameters of the discriminant criterion specialized to the overlapped region.

Note that for object pairs having the frequency of overlap that is equal to or less than a certain number in the learning data, learning and recognition processes may be omitted to give higher priority to the processing speed.

If there is a region three or more objects overlap with each other, the overlap may be divided into pairs, each of the pairs may be separately discriminated, and the category with the highest likelihood may be adopted.

Next, the feature quantity in the second embodiment is additionally described. Even for the case of discriminating the region where objects overlap with each other, the feature quantity that is relatively determined based on the object detection result used in the first embodiment is effective. There is, however, a problem in that since the overlapped region includes two related objects, two types of relative feature quantities are calculated. Measures for solving this problem are use of the two in a combined manner. More specifically, the feature quantity of the local region x may be defined as the following Expression (11).

$$\text{Feature quantity in local region } x := [\text{normal feature quantity}^T, \text{relative feature quantity}^T \text{ for object 1, relative feature quantity}^T \text{ for object 2}]^T, \quad (11)$$

Where the relative feature quantity for the object 1 is obtained by converting, into a vector, the degree of similarity between the local region x and the object 1 or the relative position between the local region x and the object 1, as with the first embodiment. If the order of the object 1 and object 2 varies according to data, learning and discrimination cannot be correctly performed. It is appropriate that the order list of objects is preliminarily defined, and the objects are always defined according to the same order such that the former object in the list is the object 1 and the latter object is the object 2.

The description is finished for the second embodiment for correctly discriminating the regions of the objects in the case where objects overlap with each other.

Third Embodiment

A third embodiment of the present invention is described. The third embodiment has an object to estimate the type, region, position, orientation, and overlapping relationship of industrial components, which are objects, using, as input data, data on a range image where one or more industrial components are taken. Here, a usage is assumed that causes a manipulator to automatically grasp an object based on the recognition result.

The third embodiment is disclosed as an example for indicating that the present invention is applicable not only to the embodiments having been described above but also widely to pattern recognition according to various configurations. This embodiment adopts a method that is largely different from the above two embodiments in discrimination of the local region and detection of the object. This embodiment includes an operation flow of alternately and repeatedly processing recognition of discriminating the local region and recognition of detecting the object, to improve recognition accuracy. The configuration of this embodiment is different from the configurations of the above two embodiments in these two points.

The difference, however, emphasizes the inventive element forming the essence of the present invention common to this embodiment and the other embodiments. That is, one of the inventive elements is that a discriminant criterion specialized to the type or orientation of object is preliminarily learned, the parameters of the discriminant criterion in the local region are switched according to the object detection result. The other of the inventive elements is that in the case of discriminating whether each local region in an image is a part of an object or the background, the accuracy is improved by also using <feature quantity relative to object> having a value varying according to the object detection result. Advantageous effects of these two points for improving the recognition accuracy also in this embodiment as with the embodiments described above are described as follows.

An overview of this embodiment is described. This embodiment roughly includes two recognition modules. One is a recognition process that discriminates the local region according to a classification tree method called random forest. The other is a recognition process that estimates the type, position and range of the object by voting a discrimination result. This embodiment enables the local region to be discriminated in detail by switching the parameters of the discriminant criterion of the classification tree according to the object detection result.

Figure 8B:
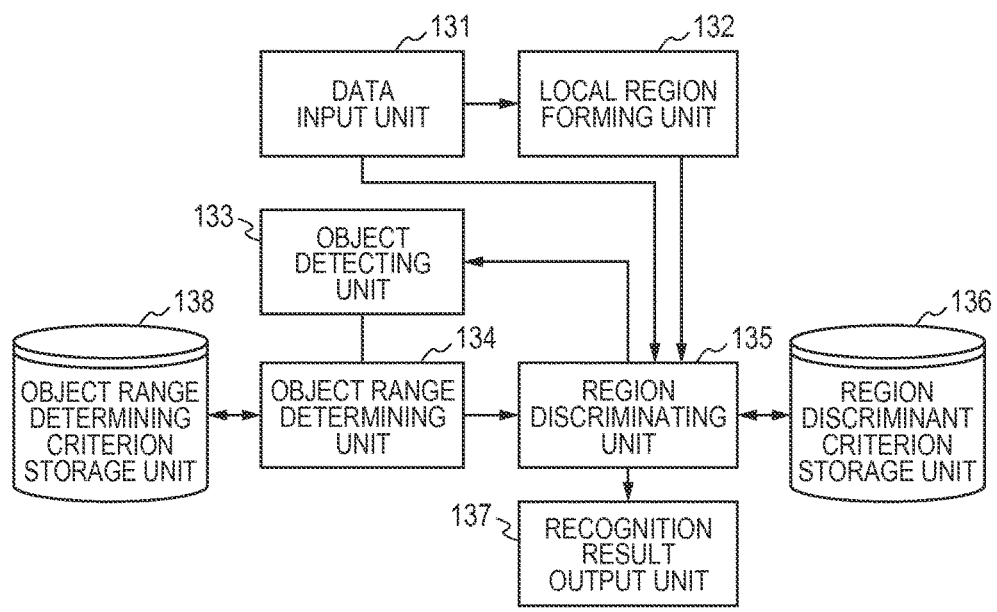

FIG. 8B illustrates a configuration of an image recognizing apparatus according to the third embodiment. The configuration elements are partially identical to the elements of the image recognizing apparatus according to the first embodiment. The functions and operations between the functions are described with reference to FIG. 8B.

A data input unit 131 receives an image data, and transmits the image to a local region generating unit 132 and a region discriminating unit 135.

The local region generating unit 132 extracts a local region from an input image according to a predetermined method, which will be described later. The region discriminating unit 135 discriminates which object type and which orientation and which portion the local region in the image belongs to, or discriminates whether the local region is the background or not.

An object detecting unit 133 estimates the type and orientation of the object based on the discrimination result in each local region.

An object range detecting unit 134 reads out the parameters of the object range determining criterion from an object range determining criterion storage unit 138 based on the recognition result of the object obtained by the object detecting unit 133, and determines the object range.

A region discriminant criterion storage unit 136 stores the parameters of the discriminant criterion in the region.

A recognition result output unit 137 integrates the discrimination results of all the objects, and outputs the integrated results.

The object range determining criterion storage unit 138 stores the parameters of the object range determining criterion.

This basic configuration includes a path through which the discrimination information of the local region output from the region discriminating unit 135 is input into the object detecting unit 133, and a path through which information on the object range of the object output from the object range detecting unit 134 is input into the region discriminating unit 135. Consequently, a loop is formed along the path of the signal. The loop is not included in the basic configurations of the above two embodiments. According to this configuration, after the object range detecting unit 134 determines the object range, information on the position, the orientation of the object and the like can be used to allow the region discriminating unit 135 to more correctly discriminate again whether the local region in the object range is an object or not. Furthermore, in response to the result, the object range detecting unit 134 performs a repetitive operation of more correctly determining the object range. Consequently, the accuracy of discriminating the region and the accuracy of estimating the position and orientation of the object can be improved in comparison with the case of one time determination.

In this embodiment, the region discriminating unit 135 uses a method called random forest that includes multiple classification trees. The method of pattern discrimination according to the random forest conforms to a publicly known method, which is Non Patent Literature 8 (J. Gall and B. Lempitsky, Class-Specific Hough Forests for Object Detection, IEEE Conference on Computer Vision and Pattern Recognition (CVPR'09), 2009). The details of the method are summarized below. In the random forest used in this embodiment, each classification tree issues a simple query (hereinafter, called query) at each node in response to an input pattern. The tree is traced from the root node to a leaf node according to the result, thereby classifying the input pattern into a terminal leaf node. Here, the query is simple one, which is, for example, the query as to whether the difference between the values of the images at predetermined two points in the local region is at least a predetermined threshold or not. Next, the random forest decides the classification result of each classification tree by a majority vote, and adopts the decision as a final classification result.

Each classification tree of the random forest of this embodiment is preliminarily leaned and created as described below. That is, the local regions of various objects with various orientations, and the local region of the background as a negative example are provided as learning data. The tree branches off based on the learning data. In this case, the tree branches off until the number of learning data items on the leaf nodes decreases and reaches a predetermined number. At the leaf node, information on the property of the learning data items classified into the node is stored. Here, the property is whether the local region belongs to the object or not. If the region belongs to the object, the property is the type and orientation of the object and the position on the object.

In the recognition process, the input local region is classified according to each classification tree in the same manner as in learning, the tree is traced to the leaf node, and the information on the property of the learning data classified into the leaf node is obtained. The information is subjected to a majority vote according to each classification tree, thereby estimating which object type and which orientation and which partial region the input local region belongs to, or whether the local region is the background or not.

There are various random forests other than the random forest described here. The mode of the random forest of the present invention is not necessarily limited to that described here. Alternatively, any mode capable of estimating the property of the local region may be adopted. Non Patent Literature 8 should be referred to for further details of the random forest.

Figure 15:
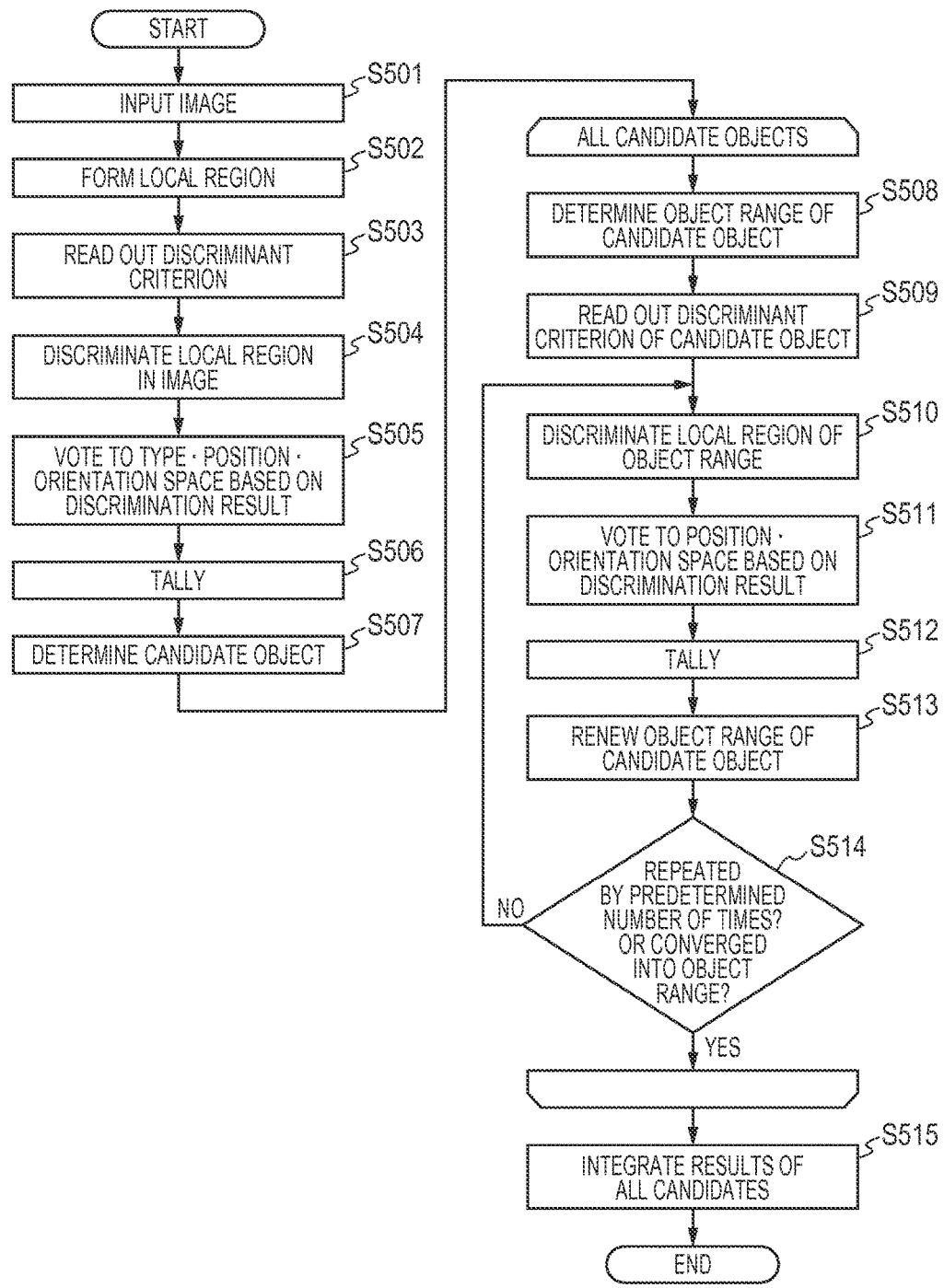
FIG. 15 is a flowchart illustrating the flow of a recognition process in a third embodiment.

FIG. 15 is a flowchart illustrating the flow of the recognition process of this embodiment. The recognition process is described also with reference to FIG. 8B.

The flow of the recognition process can be roughly divided into two. A first is a former phase that discriminates all the local regions of the image, extracts the possible objects that can reside on the image as candidate objects based on the result, and estimates their type and approximate position and orientation. A second is a latter phase that limits the object range of the candidate objects, discriminates the local region again using the object-specific discriminant criterion, and correctly identifies the type, position, orientation and region of the objects.

First, the process of the former phase is described. In step S501, the data input unit 131 receives an image. The input image is assumed to be a range image where the value of each pixel is the value of distance to the object. The range image is measured by optical measures included in the data input unit 131. It is herein assumed that the range image is obtained through slit light scanning and triangulation.

There is a possibility that one or more objects are taken in the input image. Candidates of the objects are preliminarily provided. However, it is unknown which objects are taken. The approximate size of appearance of the objects is preliminarily provided.

In step S502, the local region generating unit 132 generates the local region from the input image. The local region has a form different from that in the above two embodiments. In this embodiment, regions each having a rectangular patch shape with a predetermined size is cut out at predetermined intervals, and adopted as local regions. The local regions may overlap with each other.

In step S503, the region discriminating unit 135 reads out the parameters of discriminant criterion for discriminating the local region. The parameters of the discriminant criterion are parameters related to the random forest. As described above, the parameters are obtained by providing local regions with various objects and with various orientations and the background as learning data and by learning.

The parameters of the random forest include parameters related to a query used for branching at each node, and a property that is related to the local region and stored in each leaf node. The parameters of the query are the relative coordinate value of the pixel to be referred to and threshold. The property related to the local region is whether the local region belongs to the object or not, and, if the region belongs to the object, the type and orientation of the object and the position on the object.

In step S504, the region discriminating unit 135 operates the random forest. Consequently, it is estimated whether each local region is a region of an object or the background, and, if the region is that of the object, which type and which orientation and which part of the object the region is.

In step S505, the object detecting unit 133 integrates the discrimination results in the respective local regions. More specifically, a voting method is used. Here, voting is performed, from each local region discriminated to belong to the object, on a four-dimensional parametric space that includes the type and orientation of object to which the region belongs, and the center position (x, y) of the object. Here, the orientation of the object should originally have three-dimensional degrees of freedom. In actuality, the degrees of freedom are preliminarily vector-quantized to obtain one-dimensional parameter to prevent the voting from being sparse.

Figure 16:
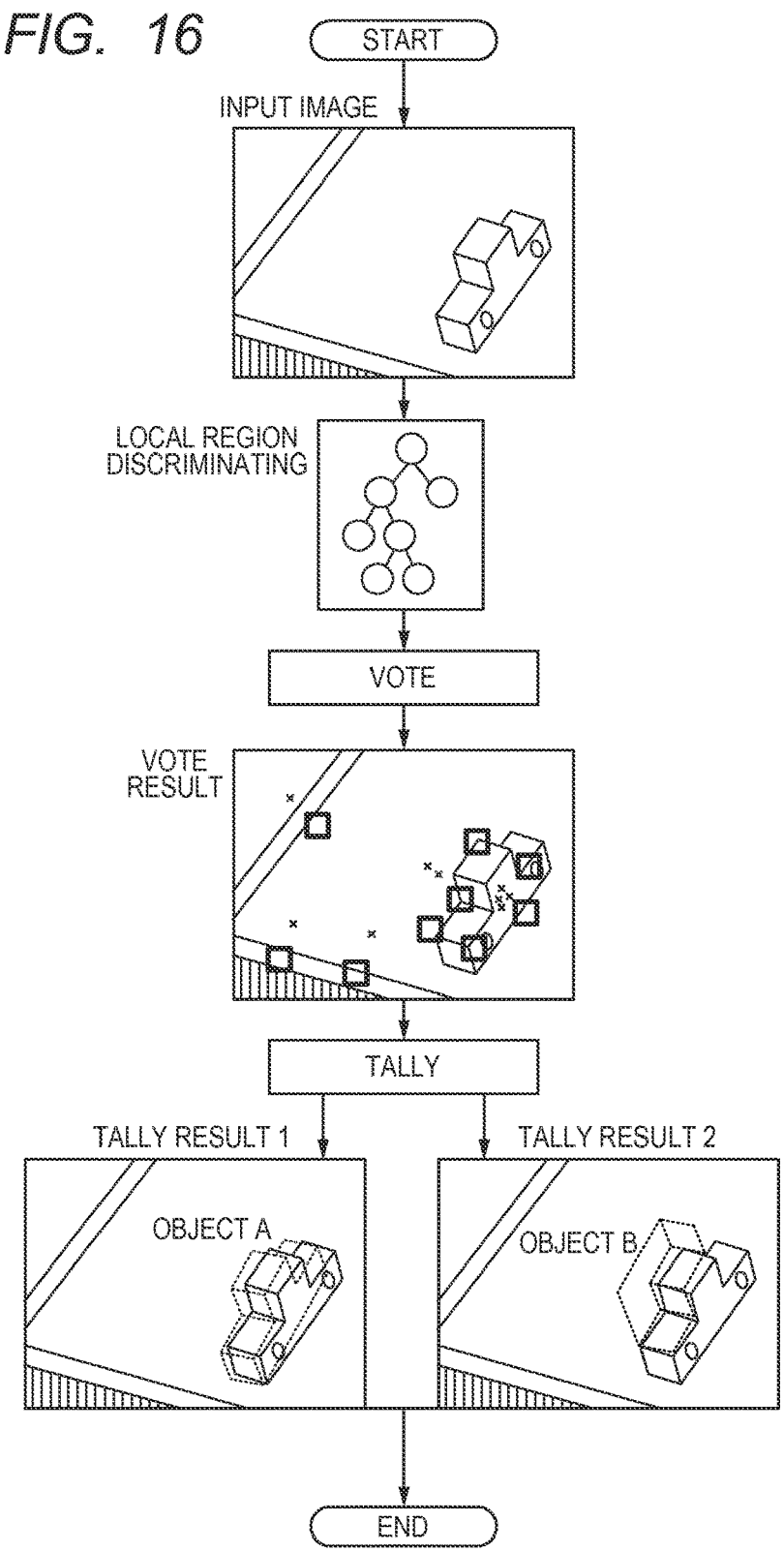
FIG. 16 is a diagram illustrating a vote result in the third embodiment.

FIG. 16 illustrates a vote result. The black frame in the diagram is a local region determined to belong to the object. Symbols "x" indicate the estimated center positions of objects on which voting are performed from the respective local regions (here, no information on the orientation and the type of object is illustrated).

In step S506, the object detecting unit 133 tallies the votes for every bin having been divided to have a predetermined size.

In step S507, if there is a bin where at least a predetermined number of votes are collected, the bin is detected as a candidate object. FIG. 16 illustrates an example of a result where a candidate object A and a candidate object B are detected at illustrated positions and orientations based on the tally result. Note that the object B is an erroneously detected candidate object because such an object does not exist in actuality.

The steps up to here configure the former phase of the recognition process. The latter phase thereafter discriminates the region in detail for each detected candidate object. Also referring to FIG. 18, which illustrates a result of the process of the latter phase, the process is described.

In step S508, the object range detecting unit 134 determines the object range of the candidate object. Here, as the parameters of the object range determining criterion, it is assumed that a set of foreground masks of the object is stored in the object range determining criterion storage unit 138, for each type and orientation of the object. The object range detecting unit 134 reads out the foreground mask of the corresponding object, and expands the mask by a predetermined number of pixels to determine the object range.

In step S509, the region discriminating unit 135 reads out the parameters of the corresponding discriminant criterion for each candidate object. As with the former phase, the parameters are a set of the parameters of random forest. Although the parameters of discriminant criterion used in the former phase are for classifying every type of object and every orientation, the type and approximate orientation of the candidate object are identified at the time of this step.

Figure 17:
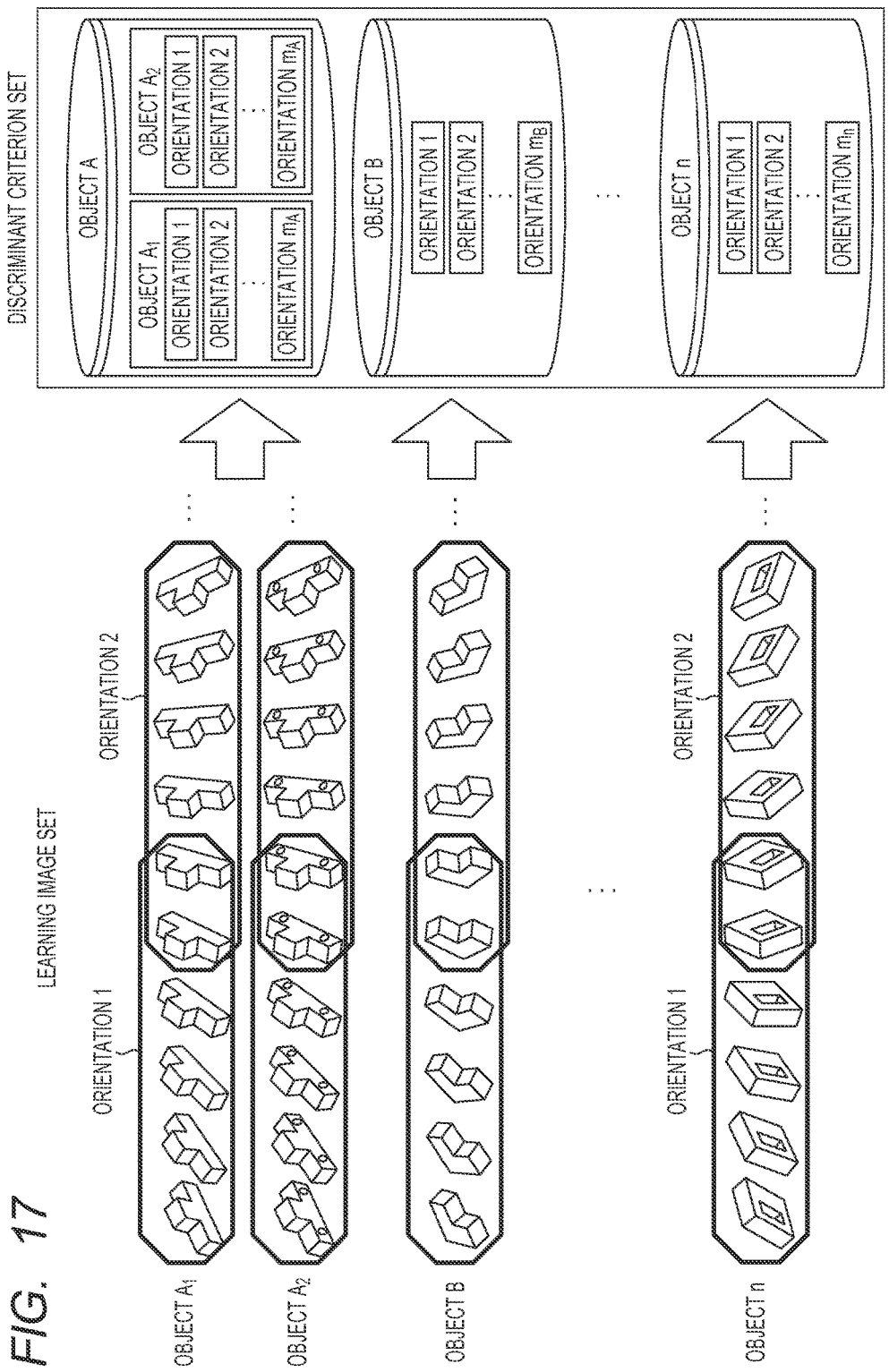
FIG. 17 is a schematic diagram illustrating a mode of storing parameters of discriminant criteria.

Accordingly, here, the parameters of the discriminant criterion specialized to the type of candidate object and its orientation are read out. FIG. 17 illustrates an example of the parameters of such a discriminant criterion. In the illustrated example, the learning images are classified into multiple groups according to the type and orientation of object. Each group is preliminarily and individually learned according to the random forest to obtain the parameters of the discriminant criterion, which are stored.

If the candidate objects are classified to have subtypes such as difference in variation of detailed shape, the parameters of the discriminant criterion are individually learned for the subtype. The parameters of the discriminant criterion are stored for each subtype. For example, as illustrated in FIG. 17, as to the object A, it is assumed that the parameters of discriminant criteria for two subtypes of objects $A_1$ and $A_2$, which have not been discriminated in the former phase, are leaned and stored. Here, as to the object A, the latter phase reads out the parameters of the discriminant criteria for both the objects $A_1$ and $A_2$, regards the two objects as candidate objects, and performs the following process.

Note that the user sets whether to regard the objects having different shapes, such as the objects $A_1$ and $A_2$, as of subtypes of the same object type or regard the objects as of independent and different types of objects, and sets the number of subtypes, in conformity with the target data and the purpose. Note that a method of automatically performing the process can be considered, and will be described below.

First, all the objects to be detected are layer-clustered based on the shapes. Clusters on layers at or exceeding an appropriate threshold are defined as a large group. Clusters on layers less than the threshold are defined as a subclass of the object. To perform this method, a degree of similarity for clustering is required to be defined between target objects. This definition can be achieved as the distance between feature quantities, using the feature quantities that represent the features of three-dimensional shapes, such as Gaussian mapping.

In step S510, the region discriminating unit 135 discriminates again the local region for each candidate object using the parameters of the discriminant criterion read out in step S509. At this time, the local regions to be discriminated are limited to local regions in the object range of each object. As a result of the discrimination process, it is more correctly estimated which portion in the candidate object each local region resides or whether each region is the background or not.

In step S511, the object detecting unit 133 votes again using the local regions discriminated as the regions of the candidate objects. The vote space is a three-dimensional space that includes the center position and the orientation of the candidate object.

In step S512, the vote result is tallied for each bin having a predetermined size, and the parameter of the bin with the highest votes is adopted as the parameter of the candidate object. Thus, the more detailed position and orientation of the candidate object can be obtained.

In step S513, the object range detecting unit 134 renews the object range of the candidate object. The object range detecting unit 134 refers to the vote result in step S512. If the votes are distributed over multiple bins, the object range is set wide because the degree of reliability of estimating the position and orientation is low. If many votes are concentrated in a specific bin, the object range is set small because the degree of reliability of estimation is high. A specific example of the method of setting the size of the object range may be, for example, a method of determining the number of pixels that expand the object foreground mask in proportion to the variance value of votes.

The above steps S510 to S513 are repeated multiple times to renew the recognition result. In step S514, it is determined whether the steps have been repeated multiple times or the object range has been converged and become invariant, and the processing proceeds to the next step S515.

In step S515, the recognition result output unit 137 receives the discrimination results of the regions of multiple candidate objects. Among the results, candidate objects with votes of at least a predetermined value are determined to actually exist and detected. All the detection results of objects are integrated, and each region is output.

Figures 18, 18A:
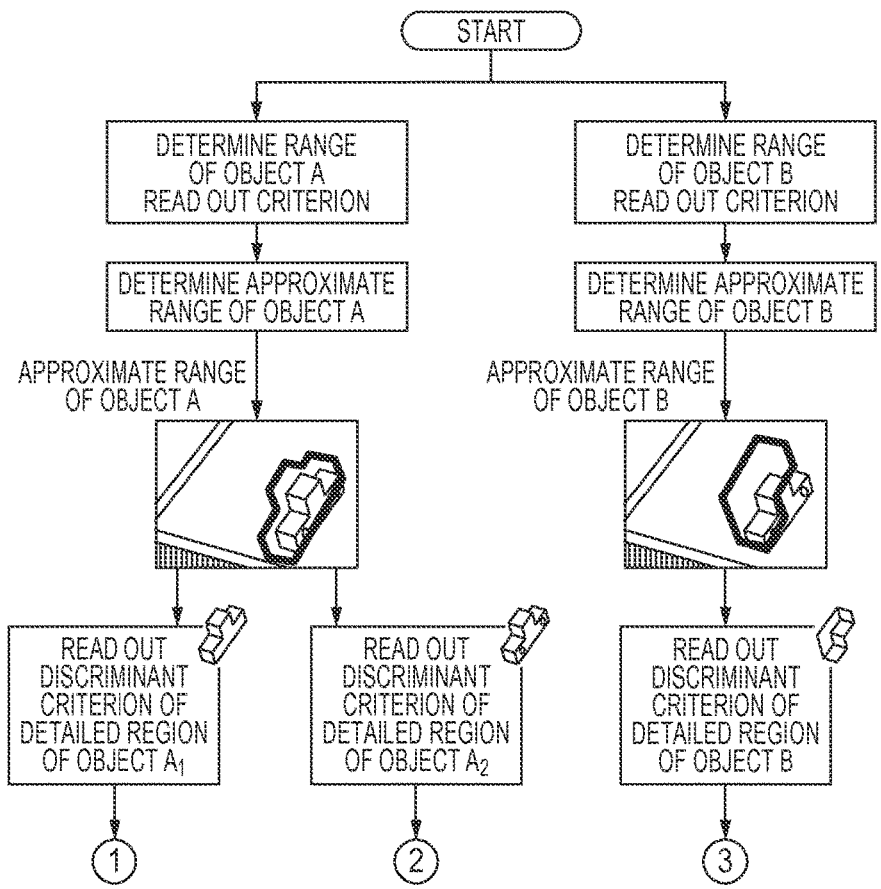
FIG. 18 is comprised of FIGS. 18A and 18B showing a diagram illustrating a result of the recognition process in the third embodiment.
Figure 18B:
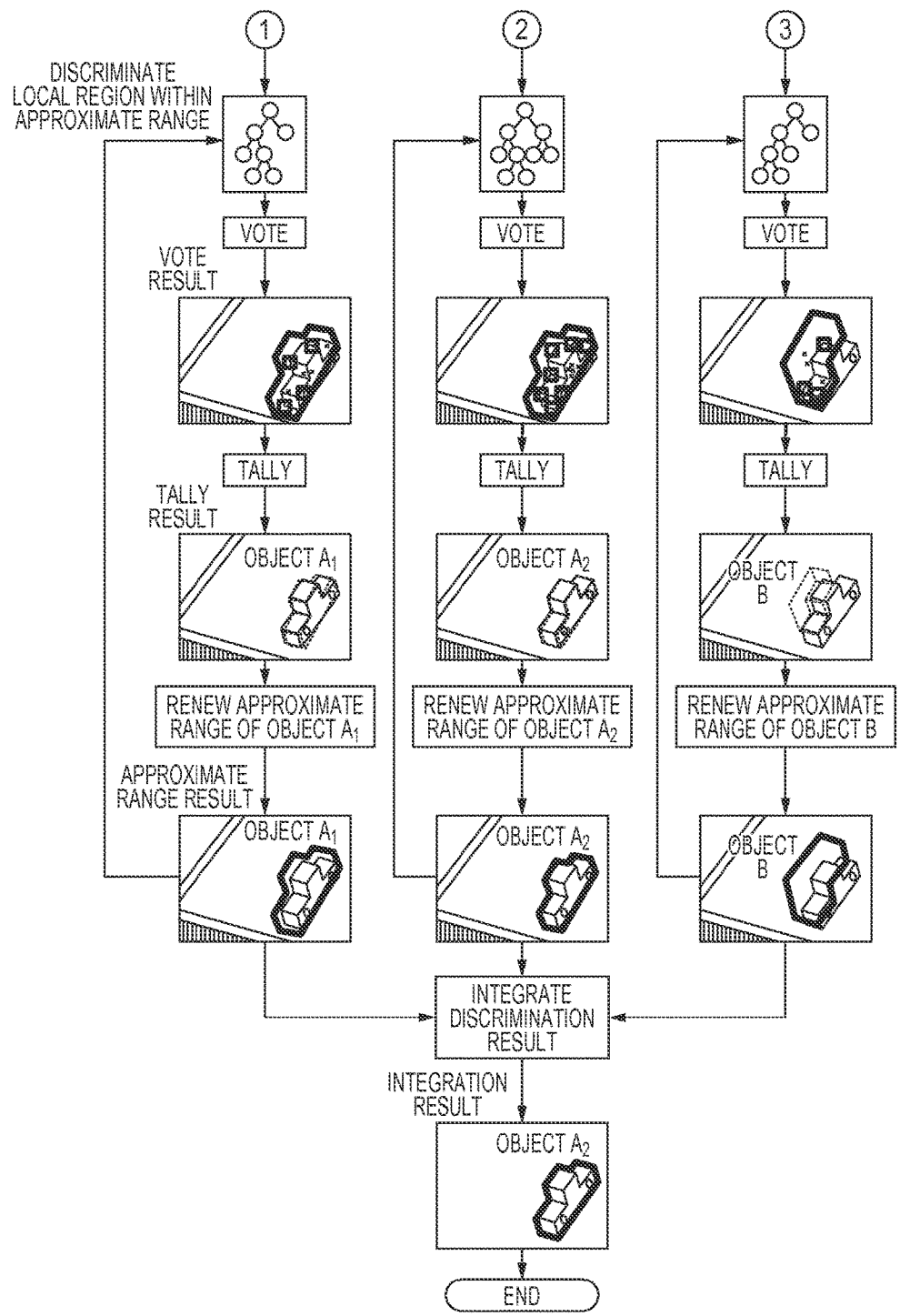

FIG. 18 illustrates an example of a result of the process of the latter phase of the recognition process. Here, two types of objects, which are an object A and object B, are obtained as the candidate objects. Next, the object ranges are determined according to the types and orientations of the objects. The parameters of the discriminant criterion corresponding to the type and orientation of the candidate object are read out. Here, the object A is accompanied by the subtypes, which are the object $A_1$ and the object $A_2$. The parameters of discriminant criteria for total three items, which are the objects $A_1$, $A_2$ and B, are read out. Next, the region is discriminated according to the discriminant criteria for each of the three candidate objects, and the object range is renewed predetermined times. The results of the three candidate objects are then integrated and output. Here, a result that the region of object $A_2$ exists in the image is finally output.

(Feature Quantity Relatively Determined Based on Object Detection Result)

Figure 19A:
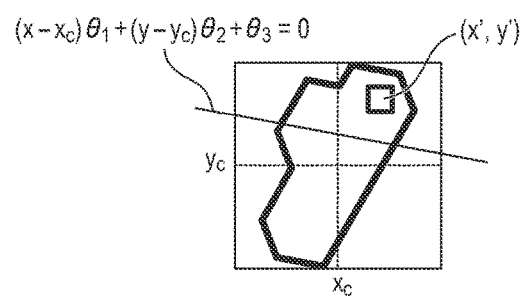
FIGS. 19A and 19B are schematic diagrams of a query for discriminating the local region.
Figure 19B:
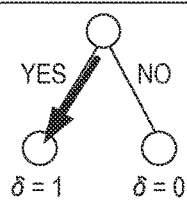

Here, measures for accurately discriminating the local region in the discrimination of local region in the above step S510 are described. The measures provide information on the approximate position of the local region on the object to allow the random forest to learn. More specifically, a query of a type as the following Expression (12) is added to the candidate of query of the classification tree.

$$\delta=1 \text{ if } (x'-x_c)\theta_1+(y'-y_c)\theta_2+\theta_3>0,$$

and $$\delta=0 \text{ if otherwise} \qquad (12)$$

where $\delta$ is a value of a result of the query, $(x_c, y_c)$ is the center position of the object, $(x', y')$ is the center position of the local region, and $\Theta=\{\theta_1, \theta_2, \theta_3\}$ is the parameter of the query. FIGS. 19A and 19B illustrate examples of a schematic diagram and a result of the query. In the example of FIGS. 19A and 19B, the query is as to whether the local region is at the upper right of the object or at the lower left of the object. The local region in this example satisfies the conditional expression. Consequently, this local region is classified into the left branch.

In learning, such queries are generated using a random parameter $\Theta$, and added to a set of candidates of queries. If there is, for example, local regions with similar appearances but have positions on the object largely different form each other, learning for accurately discriminating both the regions from each other is performed.

The mode of the query is one type of novel measures in the present invention. The measures have not been used in an existing method, such as Non Patent Literature 8, because of the following reason. That is, the query can be implemented only in a configuration as with this embodiment that detects the object and discriminates the region in detail using the result of the detection. However, the conventional method does not have such a configuration. This point is an important advantageous effect of the present invention. Accordingly, this effect is specifically emphasized here.

Figure 20A:
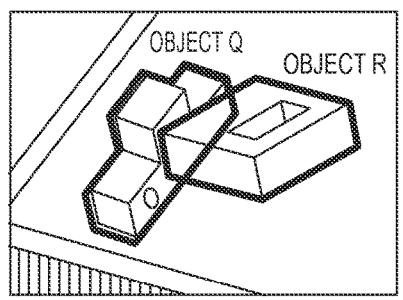
FIGS. 20A, 20B, 20C and 20D are diagrams illustrating results of a recognition process for an overlapped region in the third embodiment.
Figure 20B:
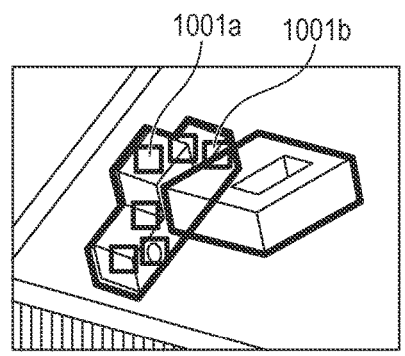
Figure 20C:
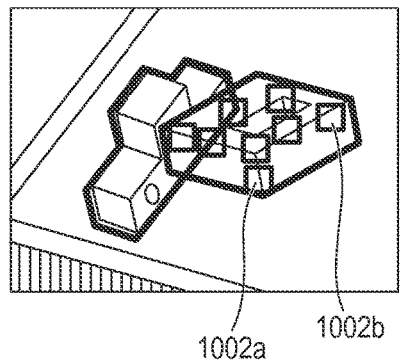
Figure 20D:
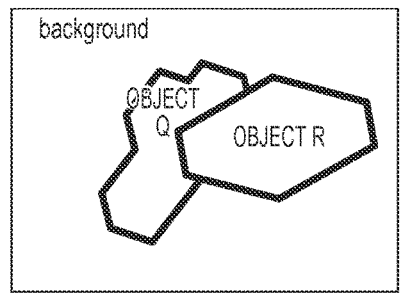

Next, as another mode of the third embodiment, measures for discriminating the foreground and background relationship in the case of objects overlapping with each other are described. Here, as illustrated in FIG. 20A, two objects overlap with each other. Black thick frames in the diagram indicate object ranges estimated as objects Q and R. In such a case, all the local regions in the overlapped region are checked, and the votes at the regions to any of the candidate objects are counted. The object having the highest votes may be determined to be at the foreground of the overlapped region. FIGS. 20B and 20C illustrate two local regions 1001a and 1001b that vote the object Q, and two local regions 1002a and 1002b that vote the object R, respectively. According to the example of FIGS. 20A to 20D, there are many local regions that vote the object R in the overlapped region. Consequently, a discrimination result as illustrated in FIG. 20D that is the final result and indicates that the overlapped region is the region of the object R is output.

Next, as another mode of the third embodiment, measures for accommodating variation in size of the object are described. In this mode, it is assumed that an approximate size of appearance of the object is preliminarily provided. In actuality, the size of the object is sometimes unknown. One example of measures against such a case is as follows. That is, the resolution is changed using hierarchical, different resolution images, and recognition is performed multiple times. Next, it is determined whether the object is in the overlapped region or not. For the overlapped region, the region of the object with the higher votes is adopted according to the same method as that in the case of discriminating the overlap between the two objects. The results may be integrated and output.

The description of the third embodiment of estimating the type, position, orientation and correct region, and the overlapping relationship between regions of the industrial component in an image is thus finished.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present invention improves the accuracy of recognizing the category of an object in an image and the region of the object, by selectively using the parameters of a discriminant criterion, based on a detection result of an object. Specifically, in the case where the object and a background region have similar appearances and the case where objects overlap with each other, a result with higher accuracy can be obtained than a conventional method.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-143276, filed Jul. 11, 2014, which is hereby incorporated by reference herein in its entirety.

What is claimed is:

1. An image recognizing apparatus comprising:
one or more processors; and
a memory storing instructions that, when executed by the one or more processors, cause the image recognizing apparatus to:
divide an input image into a plurality of local regions based on pixel values of pixels in the input image;
detect an object from the input image and identify a type of the object;
read out a discriminant criterion adapted to the identified type of the object, from a criterion memory which stores a plurality of discriminant criteria for discriminating plural types of objects;
select one or more local regions which include the detected object, from the plurality of local regions of the input image;
calculate a feature quantity of each of the selected local regions; and
determine, according to the read out discriminant criterion and based on the calculated feature quantity, a category of the selected local regions,
wherein the plurality of discriminant criteria have been learned under a condition that the object is present.

2. The image recognizing apparatus according to claim 1, wherein the instructions, when executed by the one or more processors, further cause the image recognizing apparatus to:
form local regions, which fall in a same category, as an object's whole region from the input image; and
calculate a feature quantity of local regions in the object's whole region from the input image,
wherein a discriminant criterion for discriminating the object's whole region from the input image from the plurality of discriminant criteria is further selected,
wherein categories of the plurality of local regions in the object's whole region from the input image are further discriminated according to the discriminant criterion selected and based on the calculated feature quantity of the plurality of the formed local regions in the object's whole region from the input image,
wherein categories of the plurality of local regions in a region including the detected object are further discriminated according to the discriminant criterion adapted to the type of the object and based on the calculated feature quantity of the plurality of the formed local regions, and
wherein the region of the object from the plurality of local regions including the detected object is determined based on a discrimination result.

3. The image recognizing apparatus according to claim 2, wherein the discriminant criterion for discriminating the object's whole region from the plurality of discriminant criteria is selected, when a degree of reliability as to the object.

4. The image recognizing apparatus according to claim 2, wherein a result of determining the region based on the discriminant criterion adapted to the type of the object is integrated with a result of determining the region based on the discriminant criterion for discriminating the object's whole region.

5. The image recognizing apparatus according to claim 2, wherein discrimination is based on whether the object is a background or a foreground.

6. The image recognizing apparatus according to claim 1, wherein the instructions, when executed by the one or more processors, further cause the image recognizing apparatus to:
learn a discriminant criterion adapted to each of the plural types of the objects, based on learning data including learning data of at least one of the plural types of objects.

7. The image recognizing apparatus according to claim 1, wherein the category of each of the plurality of local regions in the object's whole region from the input image is determined.

8. The image recognizing apparatus according to claim 7, wherein the category is the type of the detected object.

9. The image recognizing apparatus according to claim 7, wherein the category is the type and an orientation of the detected object.

10. The image recognizing apparatus according to claim 1, wherein the discriminant criterion is selected based on a property of an orientation of the object, to determine the region of the object.

11. The image recognizing apparatus according to claim 1, wherein
a plurality of the discriminant criteria for discriminating a plural types of objects are prepared as discriminant criteria each corresponding to each of subclasses of the plural types of objects, and
the discriminant criterion is selected based on a subclasses estimated based on a detection result of the object to determine the region of the object.

12. The image recognizing apparatus according to claim 11, wherein the sub class corresponds to a group classified preliminary based on a degree of similarity of a predetermined region of the object.

13. The image recognizing apparatus according to claim 1, wherein the plural types of objects are overlapped with other object.

14. The image recognizing apparatus according to claim 1, wherein the calculated feature quantity is determined relatively based on a detection result of the object.

15. The image recognizing apparatus according to claim 14, wherein the calculated feature quantity is determined based on relative positions of the objects.

16. The image recognizing apparatus according to claim 15, wherein, as a query of a classification tree, relative positions of the objects is used as the calculated feature quantity.

17. The image recognizing apparatus according to claim 15, wherein the calculated feature quantity is determined based on a similarity degree in relation to the local regions.

18. An image recognizing method comprising:
dividing an input image into a plurality of local regions based on pixel values of pixels in the input image;
detecting an object from the input image and identifying a type of the object;
reading out a discriminant criterion adapted to the identified type of the object, from a criterion memory which stores a plurality of discriminant criteria for discriminating the plural types of objects;
selecting one or more local regions, which include the detected object, from the plurality of local regions of the input image;
calculating a feature quantity of each of the selected local regions; and
determining, according to the read out discriminant criterion and based on the calculated feature quantity, a category of the selected local regions,
wherein the plurality of discriminant criteria have been learned under a condition that the object is present.

19. A non-transitory computer readable storage medium that stores a program for operating a computer to execute a process comprising:
dividing an input image into a plurality of local regions based on pixel values of pixels in the input image;
detecting an object from the input image and identifying a type of the object;
reading out a discriminant criterion adapted to the identified type of the object, from a criterion memory which stores a plurality of discriminant criteria for discriminating the plural types of objects;
selecting one or more local regions which include the detected object, from the plurality of local regions of the input image;
calculating a feature quantity of each of the selected local regions; and
determining, according to the read out discriminant criterion and based on the calculated feature quantity, a category of the selected local regions,
wherein the plurality of discriminant criteria have been learned under a condition that the object is present.

* * * * *